US011491494B2

United States Patent
Tsukuda et al.

(10) Patent No.: US 11,491,494 B2
(45) Date of Patent: Nov. 8, 2022

(54) SEPARATOR FILM CONVEYANCE DEVICE FOR NONAQUEOUS ELECTROLYTIC-SOLUTION SECONDARY BATTERY AND METHOD FOR MANUFACTURING SEPARATOR FILM FOR NONAQUEOUS ELECTROLYTIC-SOLUTION SECONDARY BATTERY

(71) Applicant: Sumitomo Chemical Company, Limited, Tokyo (JP)

(72) Inventors: Yosuke Tsukuda, Niihama (JP); Yusuke Kon, Niihama (JP); Wataru Sakuma, Niihama (JP); Akinobu Sakamoto, Niihama (JP); Tatsuya Kataoka, Niihama (JP); Takamasa Egawa, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 274 days.

(21) Appl. No.: 16/760,027

(22) PCT Filed: Oct. 24, 2018

(86) PCT No.: PCT/JP2018/039478
§ 371 (c)(1),
(2) Date: Apr. 28, 2020

(87) PCT Pub. No.: WO2019/087892
PCT Pub. Date: May 9, 2019

(65) Prior Publication Data
US 2021/0184310 A1     Jun. 17, 2021

(30) Foreign Application Priority Data

Oct. 30, 2017 (JP) .............................. JP2017-209675
Oct. 30, 2017 (JP) .............................. JP2017-209676

(Continued)

(51) Int. Cl.
*B03C 1/00* (2006.01)
*H01M 50/403* (2021.01)
(Continued)

(52) U.S. Cl.
CPC .................. *B03C 1/00* (2013.01); *B03C 1/02* (2013.01); *B65H 20/02* (2013.01); *B65H 35/02* (2013.01);
(Continued)

(58) Field of Classification Search
CPC ... B03C 1/00; B03C 1/02; B03C 1/12; H01M 50/403; B65H 20/02; B65H 35/02
See application file for complete search history.

(56) References Cited

U.S. PATENT DOCUMENTS 2,858,021 A * 10/1958 Baermann ................ B03C 1/24
                                                                  209/215
5,000,203 A * 3/1991 Hamada .................... B03C 7/00
                                                                   134/1

(Continued)

FOREIGN PATENT DOCUMENTS

CN       201921736 U      8/2011
EP        3736896 A1      11/2020
(Continued)

OTHER PUBLICATIONS

English Translation of International Preliminary Report on Patentability dated May 14, 2020 in International Application No. PCT/JP2018/039478.

(Continued)

*Primary Examiner* — Patrick H Mackey
(74) *Attorney, Agent, or Firm* — Panitch Schwarze Belisario & Nadel LLP

(57) ABSTRACT

A nonaqueous electrolyte secondary battery separator film transfer device is provided which realizes a foreign object (Continued)

removing technique that is less likely to cause defects in a separator. The device includes a magnet bar which is arranged in a transfer path and generates a magnetic field for removing, from a separator film being transferred, a magnetic substance adhering to a first surface of the separator film; and an air cylinder which allows a distance to the magnet bar from the first surface of the separator film to be variable.

14 Claims, 12 Drawing Sheets

(30) Foreign Application Priority Data

Oct. 30, 2017 (JP) .............................. JP2017-209677
Oct. 30, 2017 (JP) .............................. JP2017-209678

(51) Int. Cl.
*B03C 1/02* (2006.01)
*B65H 20/02* (2006.01)
*B65H 35/02* (2006.01)

(52) U.S. Cl.
CPC ... *H01M 50/403* (2021.01); *B65H 2301/5115* (2013.01); *B65H 2701/1752* (2013.01)

(56) References Cited

U.S. PATENT DOCUMENTS

2002/0132162 A1  9/2002  Takata et al.
2014/0374947 A1  12/2014 Ichinomiya et al.
2018/0229398 A1  8/2018  Sakimoto et al.

FOREIGN PATENT DOCUMENTS

| | | | |
|---|---|---|---|
| JP | S61271043 | A | 12/1986 |
| JP | H11262679 | A | 9/1999 |
| JP | 2001063884 | A | 3/2001 |
| JP | 2001253602 | A | 9/2001 |
| JP | 2002217244 | A | 8/2002 |
| JP | 2002273684 | A | 9/2002 |
| JP | 2004073944 | A | 3/2004 |
| JP | 2004171836 | A * | 6/2004 |
| JP | 2004171836 | A | 6/2004 |
| JP | 2005044690 | A | 2/2005 |
| JP | 2008152946 | A * | 7/2008 |
| JP | 2008152946 | A | 7/2008 |
| JP | 2009164062 | A | 7/2009 |
| JP | 2011154972 | A | 8/2011 |
| JP | 2015191756 | A | 11/2015 |
| JP | 2017189732 | A | 10/2017 |
| JP | 2017189732 | A * | 10/2017 |
| WO | 2013100062 | A1 | 7/2013 |
| WO | 2017026499 | A1 | 2/2017 |

OTHER PUBLICATIONS

English Translation of International Search Report dated Jan. 22, 2019 in International Application No. PCT/JP2018/039478.
Office Action dated Jan. 21, 2022 in CN Application No. 201880070928.3.
Extended European Search Report dated Jun. 18, 2021 in EP Application No. 18873154.1.
Office Action dated Apr. 22, 2022 in CN Application No. 201880070928.3.
Office Action dated Aug. 23, 2022 in JP Application No. 2019551197 (with Partial English Translation).

* cited by examiner

FIG. 3
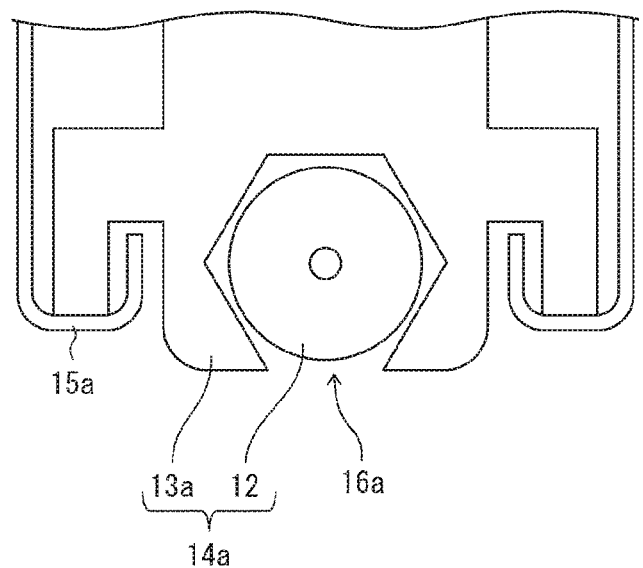
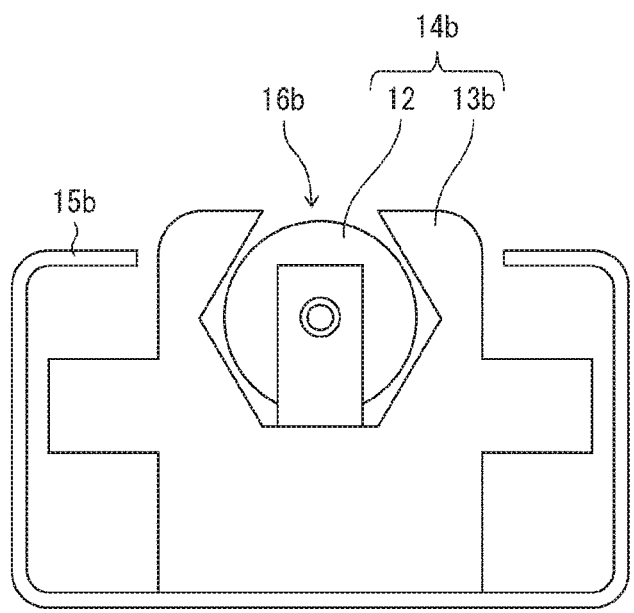

SEPARATOR FILM CONVEYANCE DEVICE FOR NONAQUEOUS ELECTROLYTIC-SOLUTION SECONDARY BATTERY AND METHOD FOR MANUFACTURING SEPARATOR FILM FOR NONAQUEOUS ELECTROLYTIC-SOLUTION SECONDARY BATTERY

CROSS-REFERENCE TO RELATED APPLICATIONS

This application is a Section 371 of International Application No. PCT/JP2018/039478, filed Oct. 24, 2018, which was published in the Japanese language on May 9, 2019, under International Publication No. WO 2019/087892 A1, which claims priority under 35 U.S.C. § 119(b) to Japanese Application No. 2017-209675, filed Oct. 30, 2017, Japanese Application No. 2017-209676, filed Oct. 30, 2017, Japanese Application No. 2017-209677, filed Oct. 30, 2017, and Japanese Application No. 2017-209678, filed Oct. 30, 2017, the disclosures of each of which are incorporated herein by reference in their entireties.

TECHNICAL FIELD

The present invention relates to a transfer device for a separator film for a nonaqueous electrolyte secondary battery, the separator film generally having a small film thickness, and a method for producing the nonaqueous electrolyte secondary battery separator film.

BACKGROUND ART

Conventionally, there has been known a technique of removing a foreign object from a target object by use of a magnet. Examples of the target object include a slurry composition for a secondary battery (Patent Literature 1), a composition for forming a fuel-cell separator (Patent Literature 2), a positive electrode plate and negative electrode plate for a battery (Patent Literature 3), a conveyor for transferring a glass piece (Patent Literature 4), and an interlayer tape used for winding a TAB tape (Patent Literature 5).

CITATION LIST

Patent Literatures

[Patent Literature 1]
Japanese Patent Application Publication Tokukai No. 2015-191756 (Publication date: Nov. 2, 2015)
[Patent Literature 2]
Japanese Patent Application Publication Tokukai No. 2011-154972 (Publication date: Aug. 11, 2011)
[Patent Literature 3]
Japanese Patent Application Publication Tokukai No. 2004-73944 (Publication date: Mar. 11, 2004)
[Patent Literature 4]
Japanese Patent Application Publication Tokukaihei No. 11-262679 (Publication date: Sep. 28, 1999)
[Patent Literature 5]
Japanese Patent Application Publication Tokukai No. 2001-253602 (Publication date: Sep. 18, 2001)

SUMMARY OF INVENTION

Technical Problem

A nonaqueous electrolyte secondary battery, which uses an organic solvent as an electrolyte, is lower in ion transfer rate than that of, for example, an alkaline battery. A lower ion transfer rate increases a time period required for ions to transfer from a positive electrode to a negative electrode and vice versa. This results in a smaller amount of power a battery puts out.

Therefore, the nonaqueous electrolyte secondary battery needs to increase the amount of battery power by compensating for the low transfer rate by including a separator film (hereinafter, unless otherwise specified, the "separator film" refers to a nonaqueous electrolyte secondary battery separator film) having a small thickness to decrease a distance over which ions transfer.

To meet such a demand, the separator film has a very small thickness of approximately 10 µm to 20 µm. Further, the separator film needs to be porous to allow ions to pass therethrough. Under these circumstances, the separator film is a very delicate material that can easily have a defect such as a tear and a wrinkle.

Meanwhile, the separator film is produced through various steps, and a foreign object may be mixed into the separator film in these steps. In a case where the foreign object is brought into the battery while adhering to the separator film, the battery characteristics may be adversely affected.

The separator film is a very delicate material as described above. For this reason, if the foreign object is eliminated in an inadvertent manner, then the above-described defects may be caused.

Therefore, in the production of a separator film, it has been an object to find a foreign object removing technique which is less likely to cause defects in a separator. The present invention has been made to achieve this object.

Solution to Problem

One important significance of the present invention for solving the above-described problem lies in the fact that, in the production of a separator film, a technique is introduced in which a magnetic substance adhering to the separator film is removed from the separator film by applying a magnetic field to the separator film being transferred while the separator film is transferred.

In a separator film, a magnetic substance is a foreign object. The technique of applying a force produced by a magnetic field to the separator film to remove the foreign object places a very low load on the separator film in comparison with other techniques and can be greatly reduce the possibility of causing the above-described defects. This effect can be said to be an effect peculiar to a separator film which is a very delicate material.

A nonaqueous electrolyte secondary battery separator film transfer device according to an aspect of the present invention includes: a transfer path through which a nonaqueous electrolyte secondary battery separator film is transferred; a first magnetic field generation source which is arranged in the transfer path and generates a magnetic field for removing, from the separator film being transferred, a magnetic substance adhering to a first surface of the separator film; and a movement mechanism which allows a distance to the first magnetic field generation source from the first surface of the separator film to be variable.

Further, a method for producing a nonaqueous electrolyte secondary battery separator film according to an aspect of the present invention includes: a transferring step of transferring a nonaqueous electrolyte secondary battery separator film; a first foreign object eliminating step of bringing a first magnetic field generation source close to a first surface of the separator film being transferred and then removing a magnetic substance adhering to the first surface of the separator film from the separator film so that the magnetic substance is eliminated; and a retracting step of retracting the first magnetic field generation source when the separator film is likely to come into contact with the first magnetic field generation source.

A nonaqueous electrolyte secondary battery separator film transfer device according to an aspect of the present invention includes: a transfer path through which a nonaqueous electrolyte secondary battery separator film is transferred; and first and second magnetic field generation sources which are arranged in the transfer path on respective sides of first and second surfaces of the separator film, and generate magnetic fields for removing, from the separator film being transferred, magnetic substances adhering to the separator film.

Further, a method for producing a nonaqueous electrolyte secondary battery separator film according to an aspect of the present invention includes: a transferring step of transferring a nonaqueous electrolyte secondary battery separator film; and a foreign object eliminating step of bringing the first and second magnetic field generation sources close to the first and second surfaces of the separator film being transferred, respectively, and then removing magnetic substances adhering to the first and second surfaces of the separator film from the separator film so that the magnetic substances are eliminated.

A nonaqueous electrolyte secondary battery separator film transfer device according to an aspect of the present invention includes: a transfer path through which a nonaqueous electrolyte secondary battery separator film is transferred; and a magnetic field generation unit including: a magnetic field generation source which generates a magnetic field for removing, from the separator film being transferred, a magnetic substance adhering to the separator film; and a cover which surrounds the magnetic field generation source and is made of a non-magnetic substance, the magnetic field generation unit being detachably arranged in the transfer path.

Further, a method for producing a nonaqueous electrolyte secondary battery separator film according to an aspect of the present invention includes: a transferring step of transferring a nonaqueous electrolyte secondary battery separator film; and a foreign object eliminating step of bringing a magnetic field generation unit close to a surface of the separator film being transferred and then removing a magnetic substance adhering to the surface of the separator film from the separator film so that the magnetic substance is eliminated, the magnetic field generation unit including: a magnetic field generation source which generates a magnetic field for removing the magnetic substance from the separator film; and a cover which surrounds the magnetic field generation source and is made of a non-magnetic substance, the magnetic field generation unit being detachably arranged in a transfer path through which the separator film is transferred.

A nonaqueous electrolyte secondary battery separator film transfer device according to an aspect of the present invention includes: a transfer path through which a nonaqueous electrolyte secondary battery separator film is transferred; a magnetic field generation source which is arranged in the transfer path and generates a magnetic field for removing, from the separator film being transferred, a magnetic substance adhering to the separator film; and an assisting mechanism which assists in the removal of the magnetic substance by the magnetic field generation source.

Further, a method for producing a nonaqueous electrolyte secondary battery separator film according to an aspect of the present invention includes: a transferring step of transferring a nonaqueous electrolyte secondary battery separator film; a foreign object eliminating step of bringing a magnetic field generation source close to a surface of the separator film being transferred and then removing a magnetic substance adhering to the surface of the separator film from the separator film so that the magnetic substance is eliminated; and an assisting step of assisting in the removal of the magnetic substance by the magnetic field generation source.

Advantageous Effects of Invention

According to an aspect of the present invention, it is possible to realize a foreign object removing technique that is less likely to cause defects in a separator.

(a) and (b) of FIG. 3 are cross-sectional views each illustrating a specific configuration example of a magnetic field generation unit.

Figure 4:
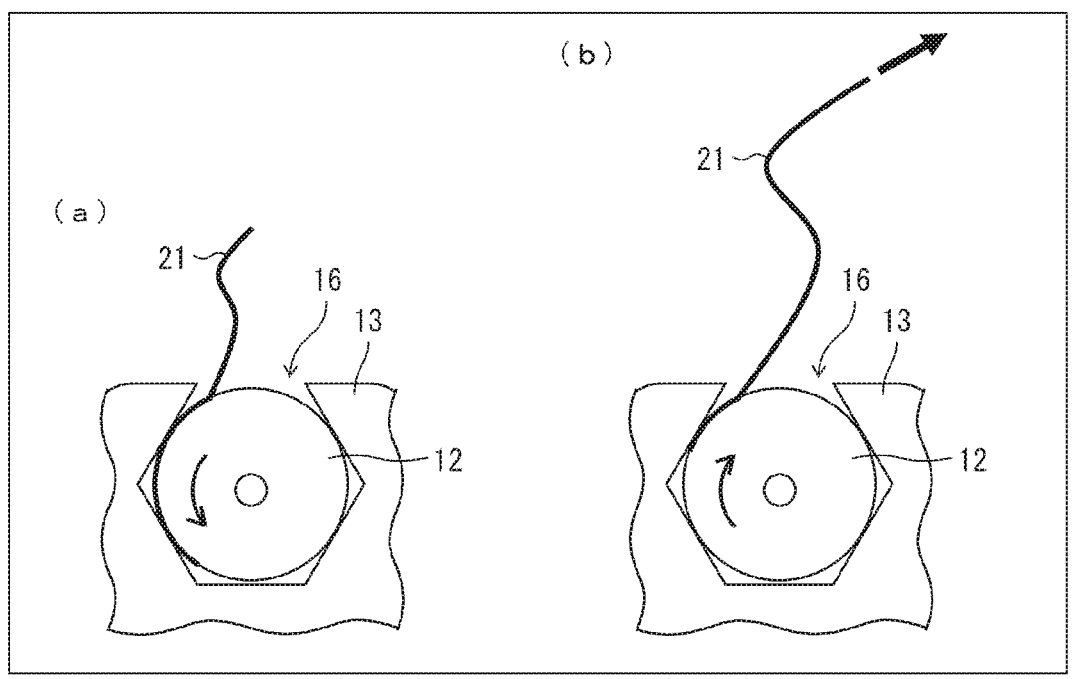

(a) and (b) of FIG. 4 are cross-sectional views each illustrating an example of a method of cleaning a magnet bar mounted into a cover.

Figure 5:
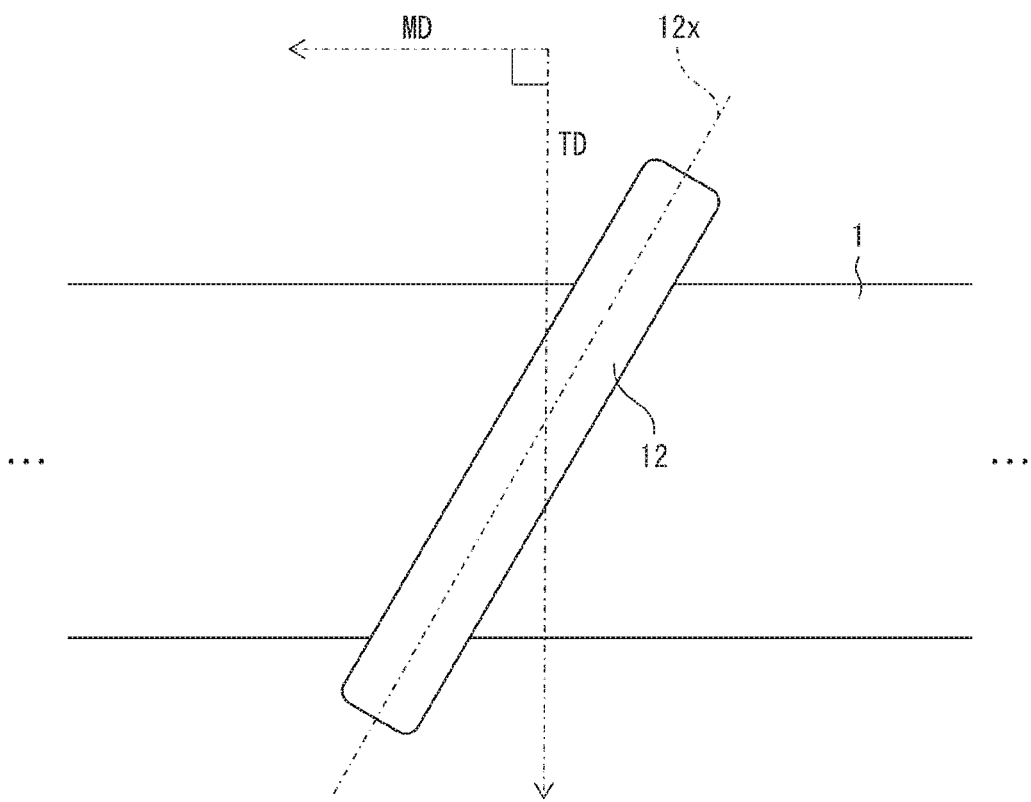

FIG. 5 is a plan view schematically illustrating a first arrangement example of a magnet bar.

Figure 6:
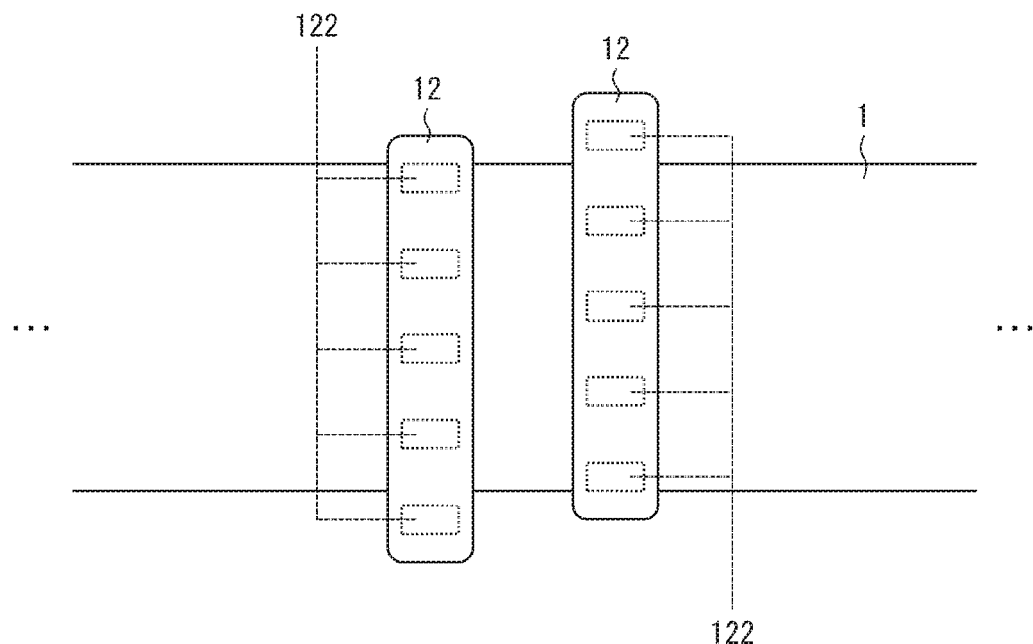

FIG. 6 is a plan view schematically illustrating a second arrangement example of a magnet bar.

Figure 7:
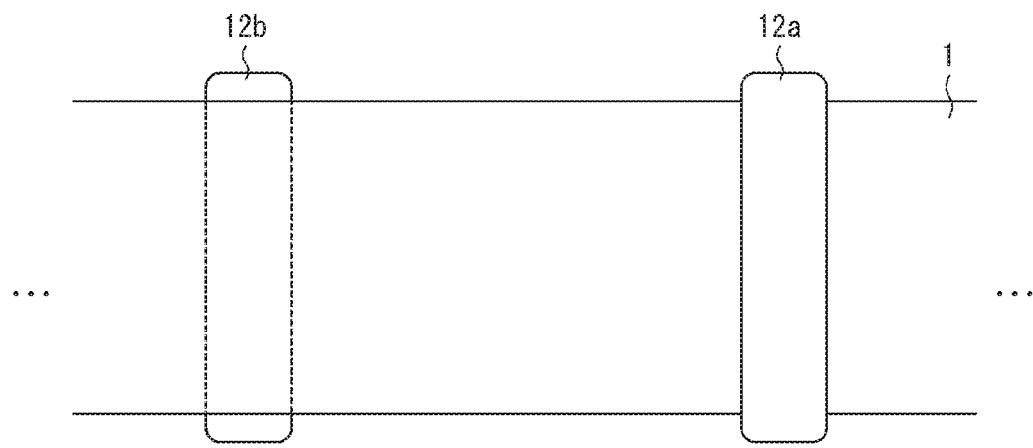

FIG. 7 is a plan view schematically illustrating a first arrangement example of a first magnet bar and a second magnet bar.

Figure 8:
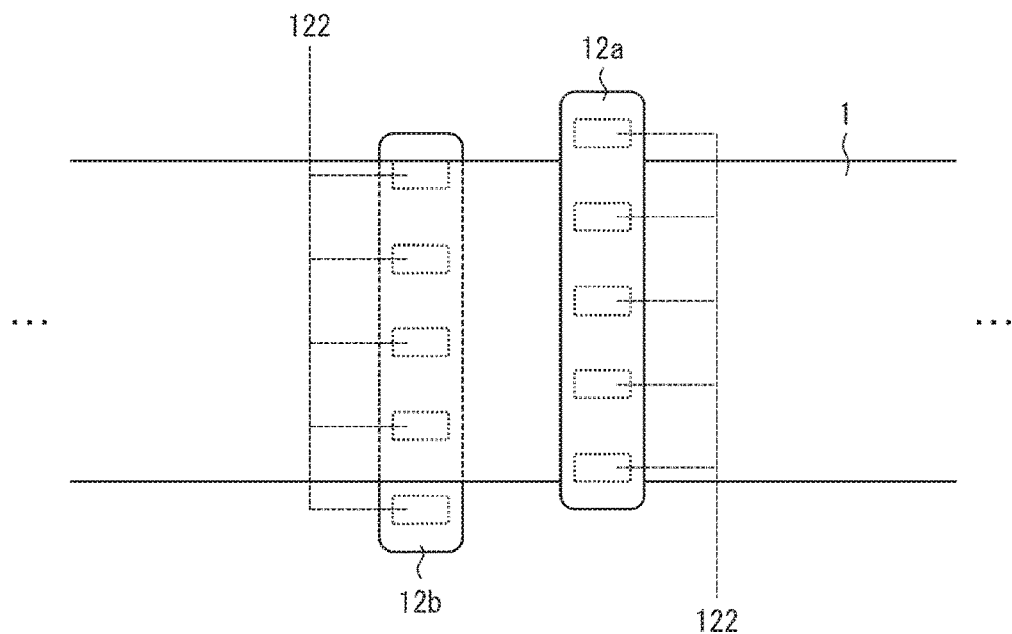

FIG. 8 is a plan view schematically illustrating a second arrangement example of the first magnet bar and the second magnet bar.

Figure 9:
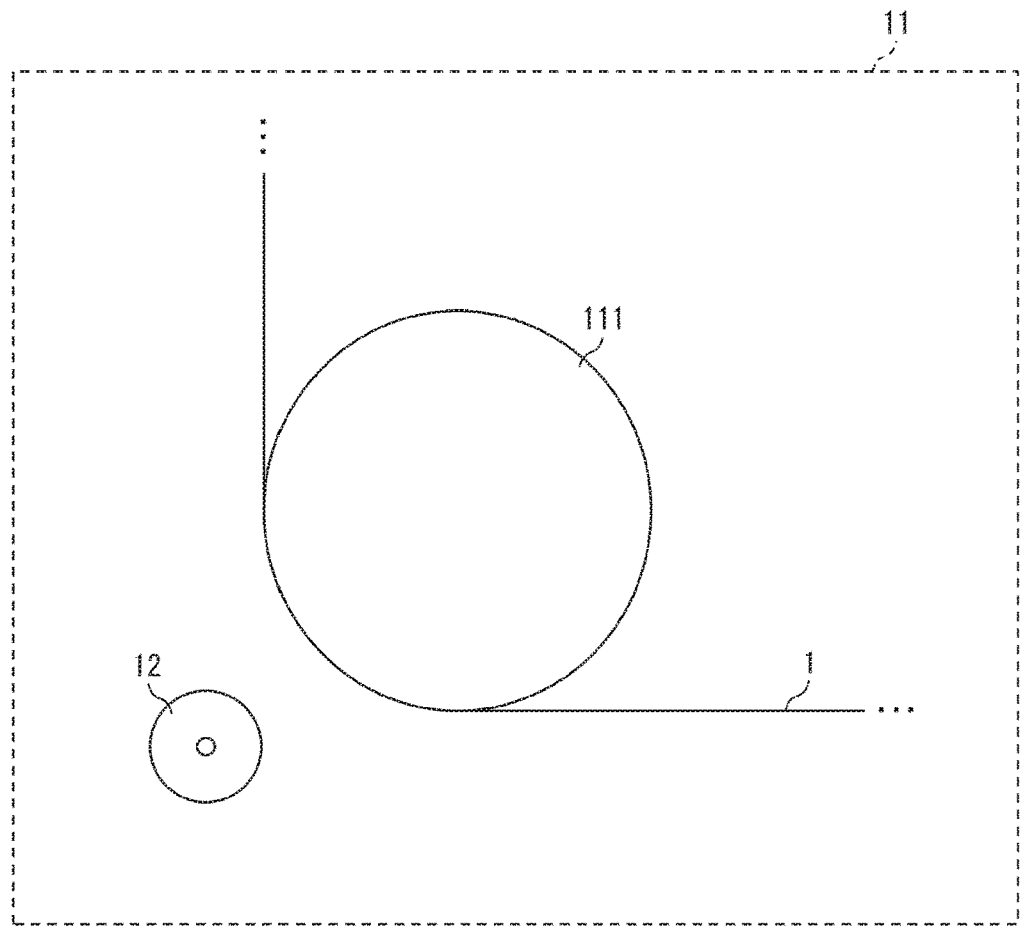

FIG. 9 is a side view schematically illustrating a first arrangement relationship of a magnet bar.

Figure 10:
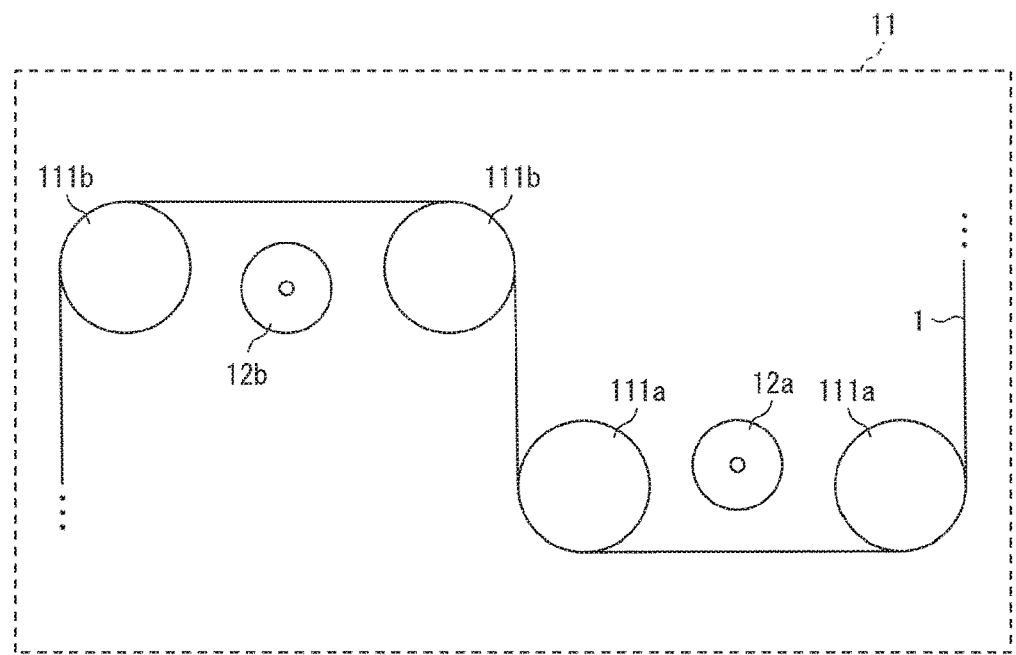

FIG. 10 is a side view schematically illustrating a second arrangement relationship of a magnet bar.

Figure 11:
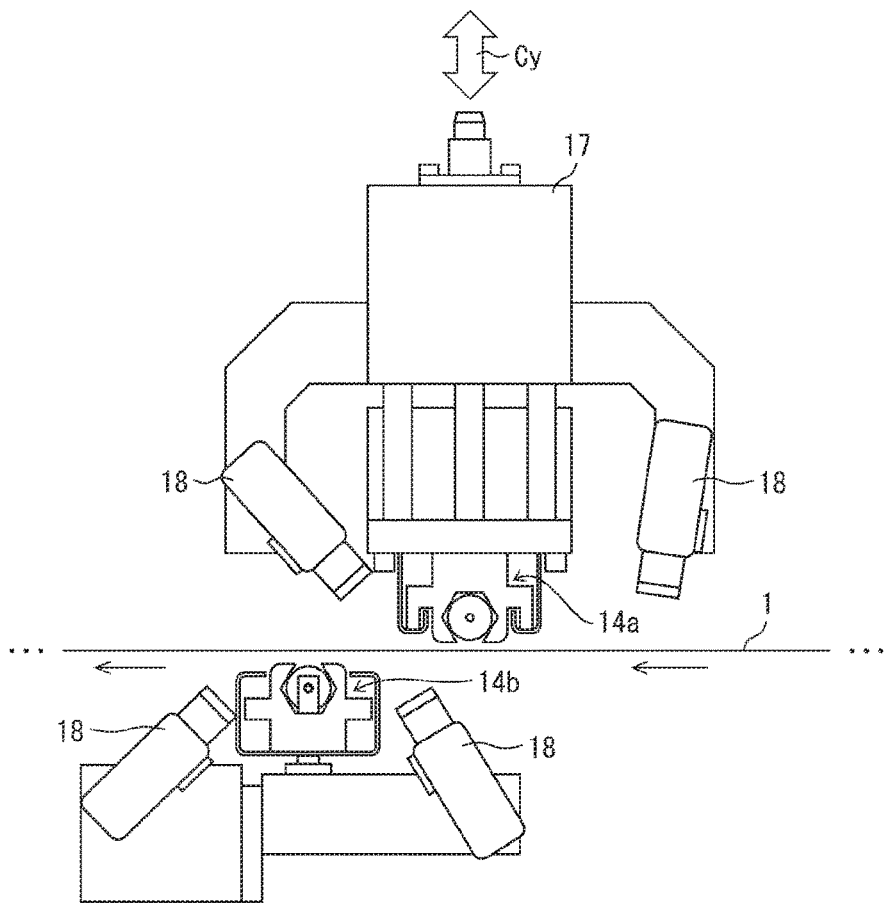

FIG. 11 is a side view schematically illustrating a first specific example of a movement mechanism for a magnet bar.

Figure 12:
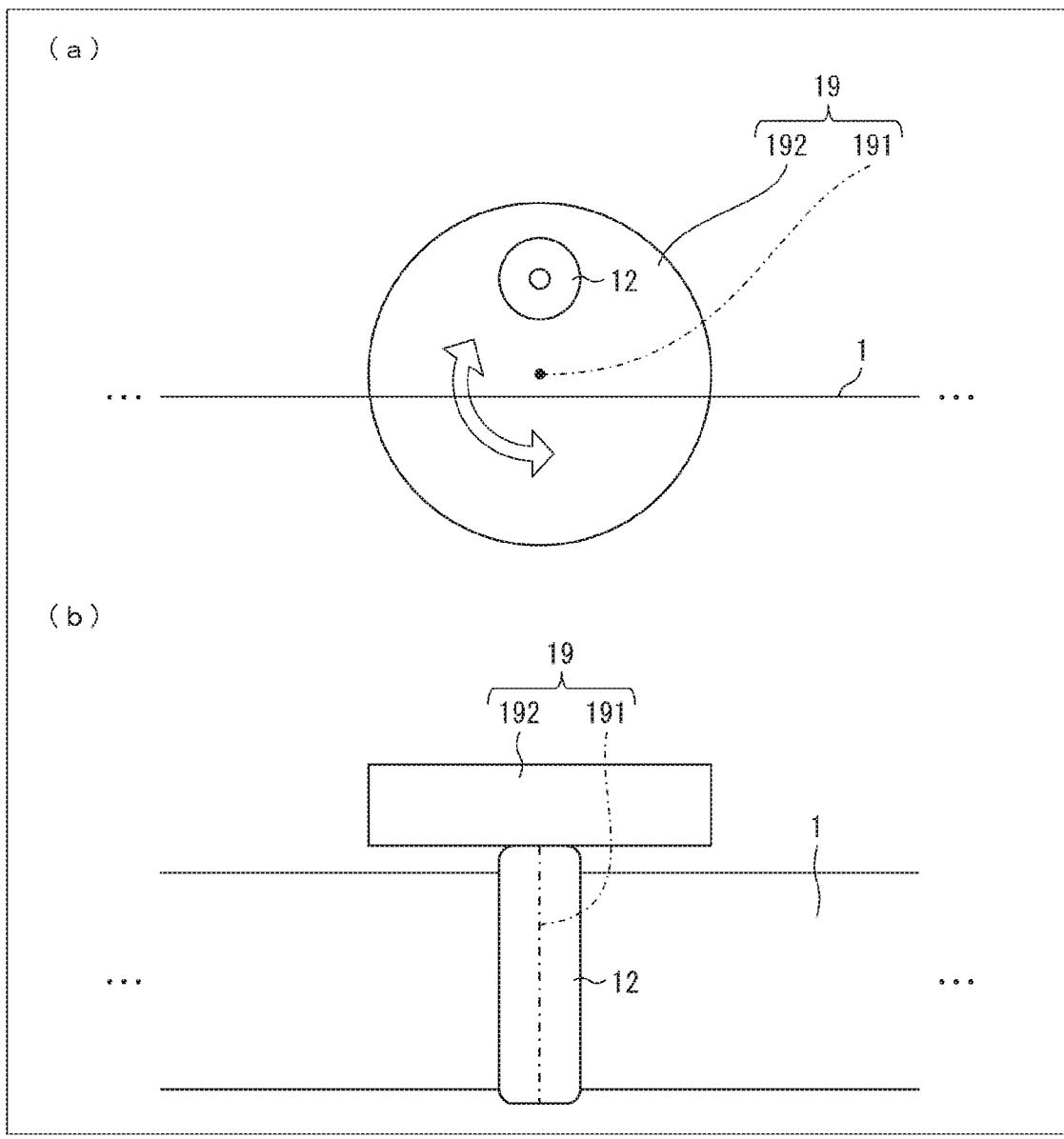

(a) of FIG. 12 is a side view schematically illustrating a second specific example of a movement mechanism for a magnet bar, and (b) of FIG. 12 is a plan view schematically illustrating the second specific example of the movement mechanism for the magnet bar.

Figure 13:
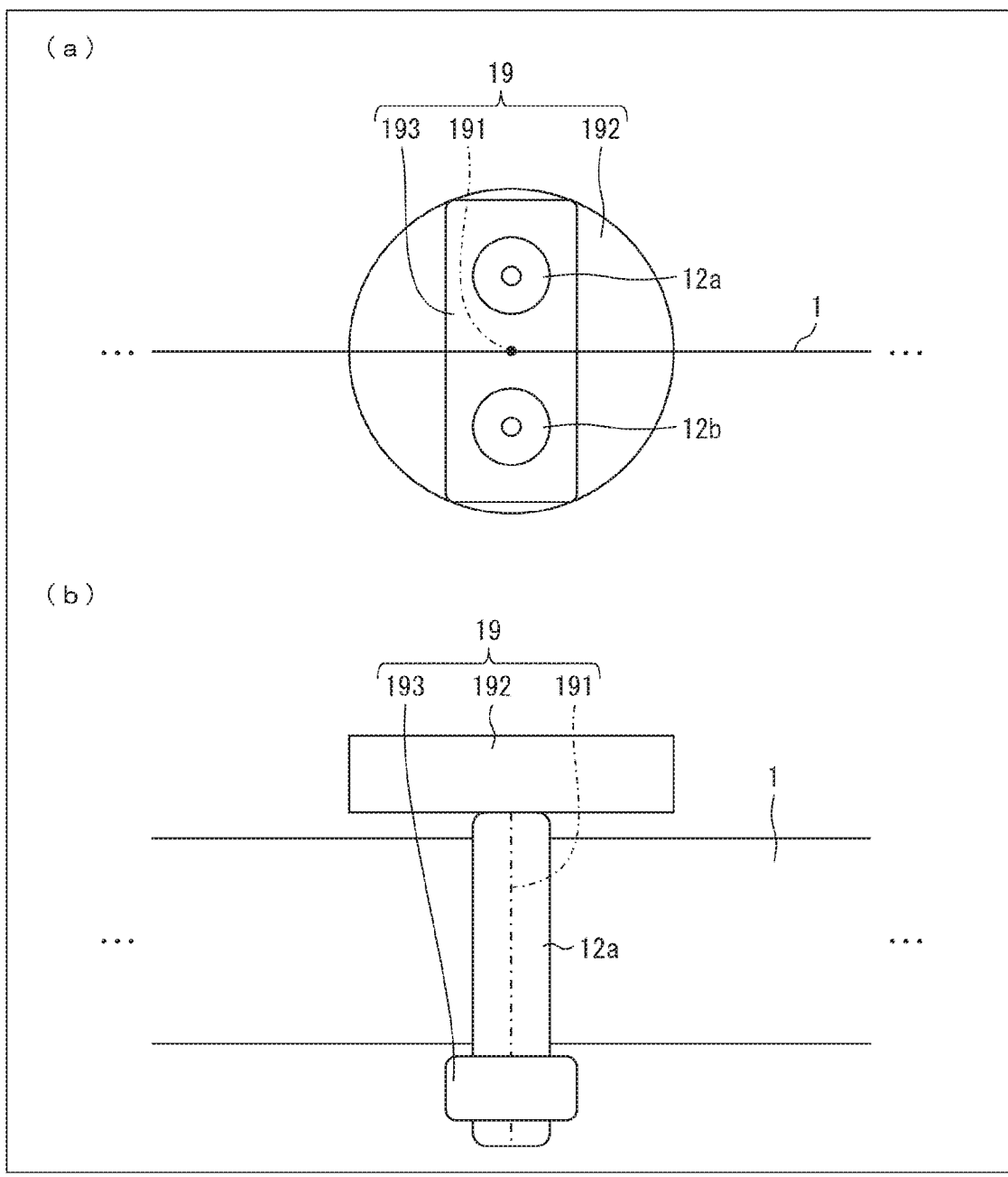

(a) of FIG. 13 is a side view schematically illustrating a variation of the second specific example of the movement mechanism for the magnet bar, and (b) of FIG. 13 is a plan view schematically illustrating the variation of the second specific example of the movement mechanism for the magnet bar.

Figure 14:
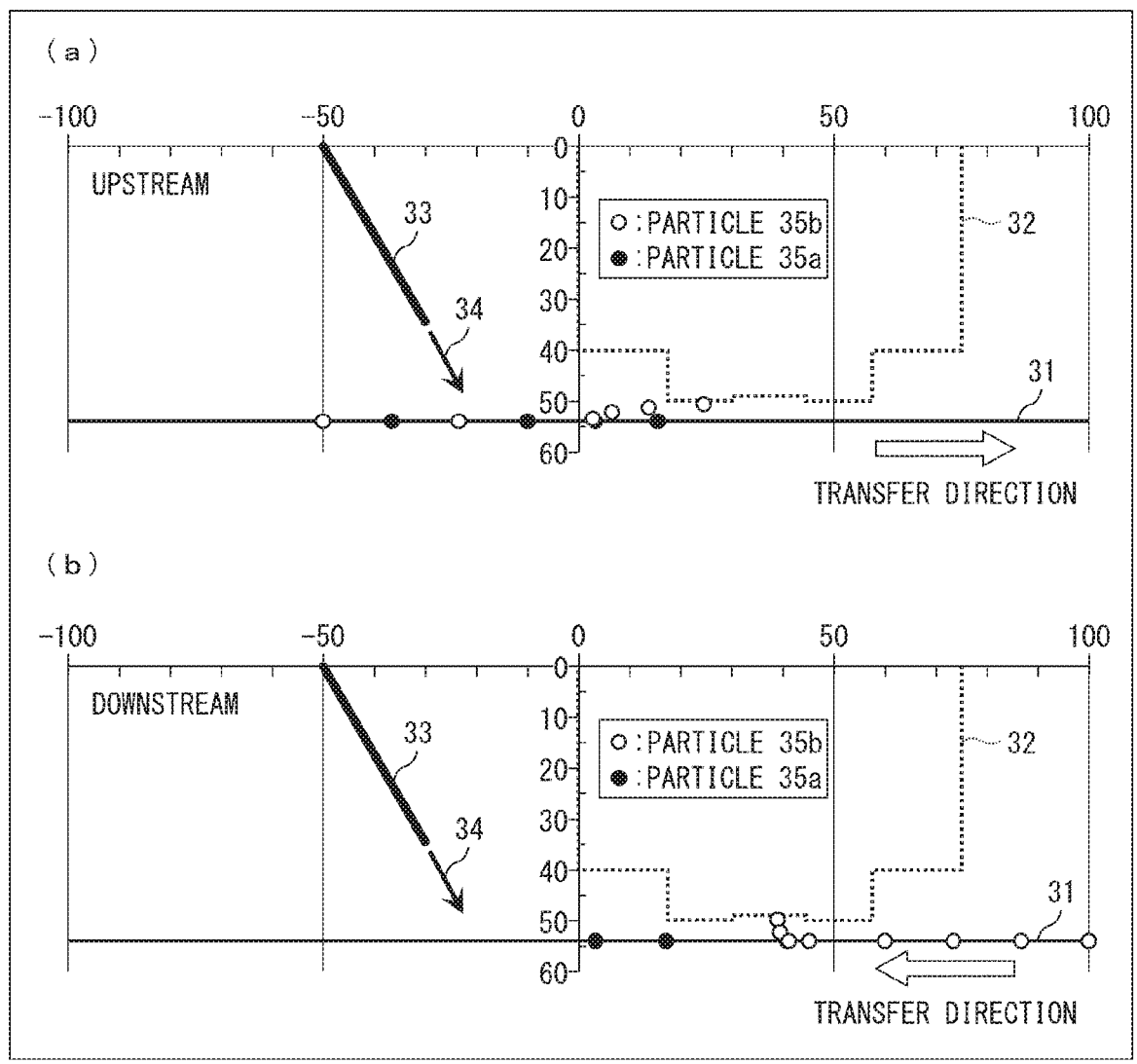

(a) and (b) of FIG. 14 are graphs showing a first simulation result relating to suitable conditions for the presence or absence of discharge and the direction of discharge by an air nozzle.

Figure 15:
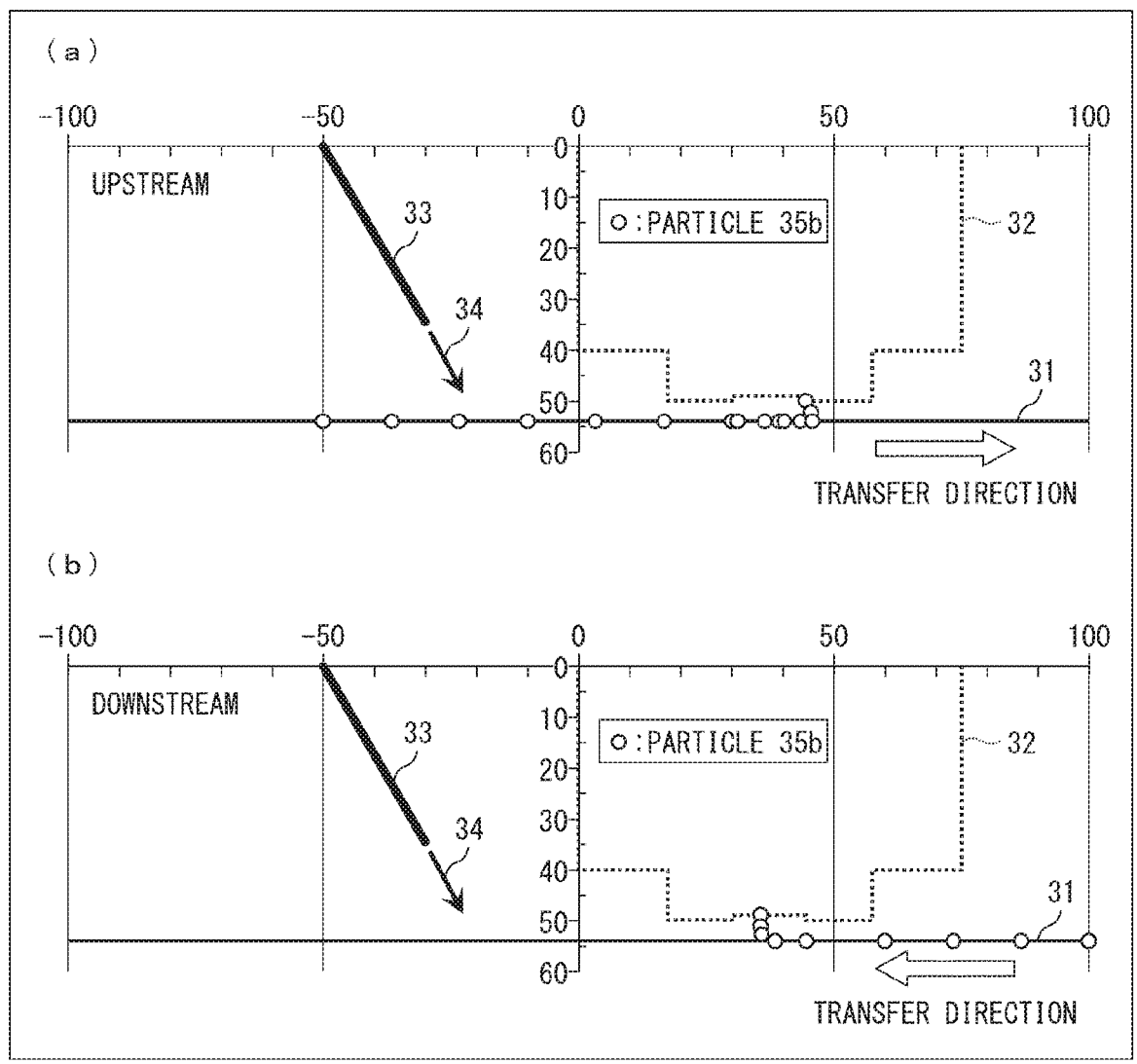

(a) and (b) of FIG. 15 are graphs showing a second simulation result relating to suitable conditions for the direction of discharge by the air nozzle.

Figure 16:
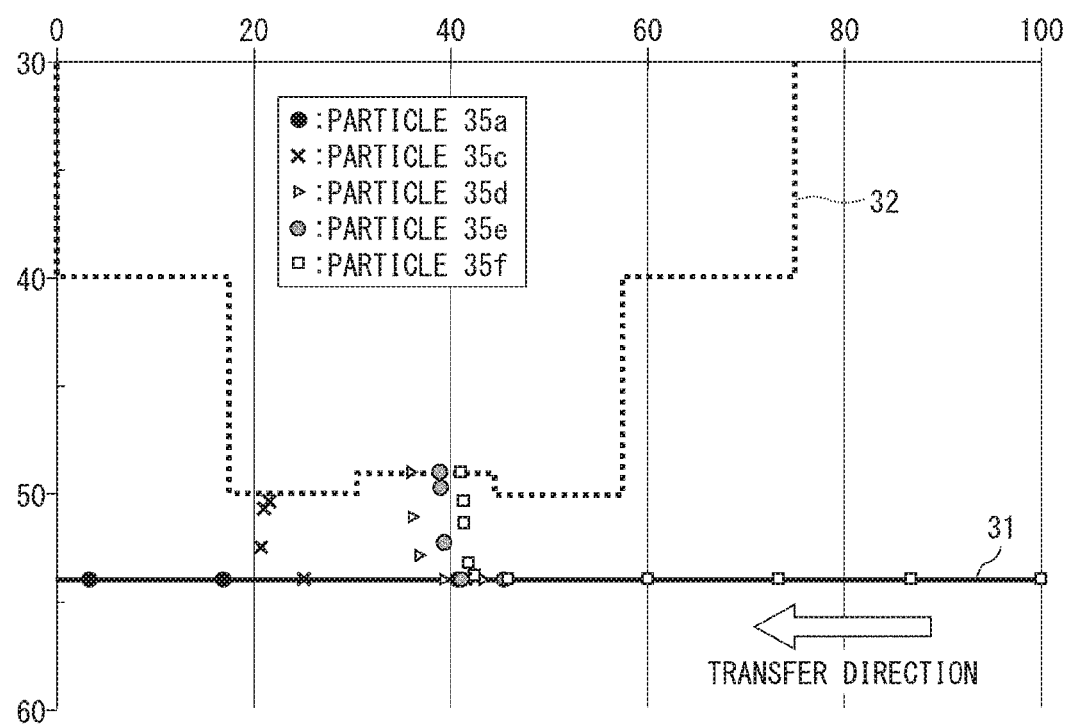

FIG. 16 is a graph showing a third simulation result relating to a suitable condition for the angle of discharge by the air nozzle.

Figure 17:
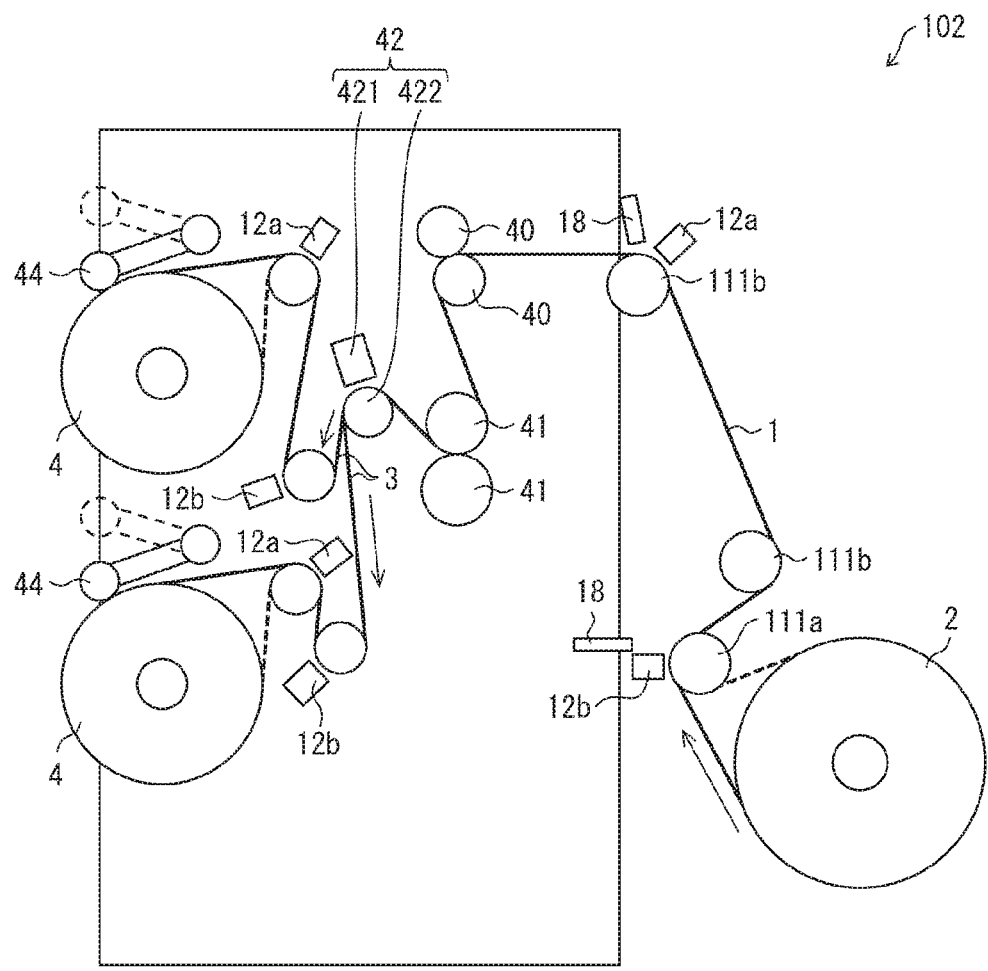

FIG. 17 is a view illustrating an example of application of the magnet bar to a slitting device for the separator film.

DESCRIPTION OF EMBODIMENTS

1. Terminology Explanations

The terms used in the present specification are explained as below.

As described earlier, the "separator film" refers to a nonaqueous electrolyte secondary battery separator film, unless otherwise specified. Further, the "separator film" encompasses an original sheet of separator film, a slit film obtained by slitting the original sheet of separator film, and an intermediate in the form of a film among intermediates obtained in the process of production of the original sheet of separator film and in the process of production of the slit film.

A "magnetic substance" refers to a substance that has the property of being attracted by a magnet. Examples of the magnetic substance include, but are not limited to, magnetic materials such as iron, cobalt, nickel, triiron tetraoxide, and ferritic stainless steel.

A "non-magnetic substance" refers to a substance that does not have the property of being attracted by a magnet. The non-magnetic substance includes, for example, austenitic stainless steels such as SUS304 and SUS316. However, these austenitic stainless steels are known to become magnetic and turn into a magnetic substance after being subjected to a physical stimulus such as a friction, plastic deformation, or an impact. Therefore, shavings and wear powder of the austenitic stainless steel produced when a production facility including the austenitic stainless steel is subjected to a physical stimulus is a magnetic substance.

2. Specifications of Separator Film and Process for Producing Separator Film The process for producing a separator film includes a kneading step, a rolling step, a removing step, a stretching step, a coating step, an original sheet roll forming step, a slitting step, a slit film roll forming step, and a transferring step.

The kneading step is a step of kneading a polyolefin resin and a film-forming plasticizer to prepare a polyolefin resin solution. Examples of the polyolefin resin include polyethylene. Examples of the film-forming plasticizer include (1) phthalate esters such as liquid paraffin, dibutyl phthalate, bis(2-ethylhexyl) phthalate, dioctyl phthalate, and dinonyl phthalate; (2) unsaturated higher alcohols such as oleyl alcohol; and (3) saturated higher alcohols such as paraffin wax and stearyl alcohol.

The rolling step is a step of performing extrusion molding of the polyolefin resin solution prepared in the kneading step and processing the polyolefin resin solution into a film in the form of a sheet.

The removing step is a step of removing a film-forming pore forming agent from the film formed in the rolling step to obtain a film in which fine pores are formed.

The stretching step is a step of stretching the film having the fine pores formed therein to obtain an original sheet of a porous film (hereinafter, referred to as a "porous film original sheet"). The removing step and the stretching step may be carried out in reverse order. That is, the porous film original sheet can also be obtained by removing the pore forming agent from the stretched film.

The coating step is a step of forming a heat-resistant layer on at least one surface of the porous film. For example, the coating step is a step of forming an aramid heat-resistant layer by applying an aramid/NMP (N-methyl-pyrrolidone) solution (coating solution) to the porous film. For example, it can be said that the coating step is a step of forming a heat-resistant layer containing fine particles by applying a coating solution containing a filler such as fine particles of alumina and a binder resin to the porous film. In the coating step, a porous laminated film original sheet is obtained by forming the heat-resistant layer on at least one surface of the porous film.

The original sheet roll forming step is a step of winding up the above-described film original sheet or laminated film original sheet to form an original sheet roll. The slitting step is a step of forming a slit film by slitting the original sheet in a direction of transfer of the original sheet by use of a slitting device. The slit film roll forming step is a step of winding up a slit film to form a slit film roll.

Further, the transferring step is a step of transferring a separator film in the steps from the removing step to the slit film roll forming step. The separator film used in the present specification includes the above-described film in the form of a sheet, a film having fine pores formed therein, a porous film original sheet, a porous laminated film original sheet, and a slit film.

The film thickness of the separator film has a very small thickness of approximately 10 µm to 20 µm. It can be seen that the separator film is a very delicate material that can easily have defects such as a tear and a wrinkle.

In the present embodiment, a magnetic field generation source is arranged in a transfer path 11 through which the separator film 1 is transferred. The magnetic field generation source generates a magnetic field for removing, from the separator film 1 being transferred, a magnetic substance adhering to the separator film 1. This makes it possible to remove a foreign object made of a magnetic substance from the separator film 1 being transferred.

Figure 1:
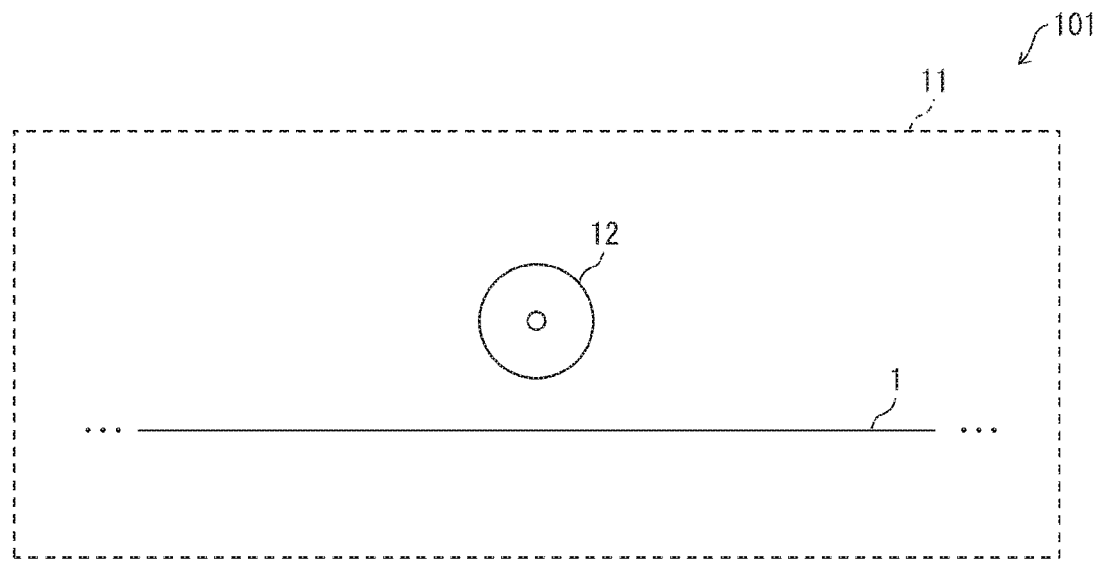
FIG. 1 is a side view schematically illustrating the most primitive configuration of a nonaqueous electrolyte secondary battery separator film transfer device in accordance with an embodiment of present invention.

FIG. 1 is a side view schematically illustrating the most primitive configuration of a transfer device (nonaqueous electrolyte secondary battery separator film transfer device) 101 in accordance with an embodiment of present invention. The transfer device 101 includes a transfer path 11 through which a nonaqueous electrolyte secondary battery separator film 1 is transferred. In addition, the transfer device 101 includes a magnet bar (magnetic field generation source) 12. The magnet bar 12 is arranged in the transfer path 11 and generates a magnetic field for removing, from the separator film 1 being transferred, a magnetic substance adhering to the separator film 1.

The components which are preferably further employed in the transfer device 101 will be described below in order.

First, the magnet bar 12, which is a specific example of the magnetic field generation source, will be described.

3. Element Invention for Eliminating Foreign Object

[Configuration of Magnet Bar]

Figure 2:
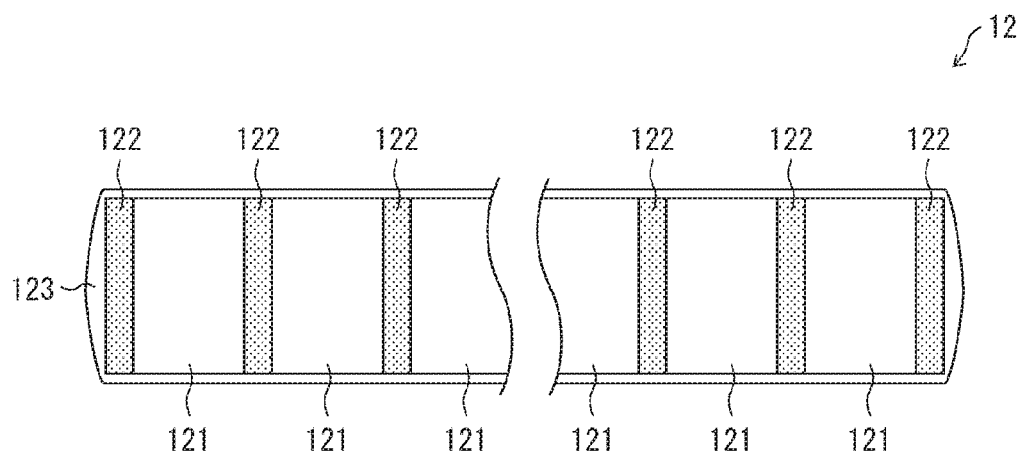
FIG. 2 is a cross-sectional view illustrating a specific configuration example of a magnet bar.

FIG. 2 is a cross-sectional view illustrating a specific configuration example of the magnet bar 12. FIG. 2 illustrates a cross-section of the magnet bar 12 along the separator film 1 in FIG. 1. As illustrated in FIG. 2, the magnet bar 12 is configured such that a plurality of magnets 121 and a plurality of yokes 122 interposed between the magnets 121 are aligned in the form of a line in a plane along the separator film 1. The magnet bar 12 has a case 123 that accommodates the plurality of magnets 121 and the plurality of yokes 122. The case 123 is formed of a non-magnetic stainless steel (SUS) and is shaped in a pipe. Although a material of which the case 123 is constructed is not limited to non-magnetic stainless steel, the case 123 is preferably constructed of a non-magnetic material when the effect on a magnetic field of the magnet 121 is taken into consideration.

The magnet bar 12 enables a magnetic flux to be concentrated in a portion in the vicinities of the yokes 122 due to the interposition of the plurality of yokes 122. This makes it possible to enhance the effect of eliminating a foreign object in the portion where the magnetic flux is concentrated. Further, the magnet bar 12, due to the case 123, can inhibit the entry of a foreign object into gaps between the magnets 121 and the yokes 122. In addition, the magnet bar 12, due to the case 123 provided in the magnet bar 12, is easy to clean and improves safety during handling. The thickness of the case 123 is, for example, 0.1 mm to 2 mm. With a smaller thickness of the case 123, the magnet bar 12 is more effective in eliminating a foreign object. In this respect, the thickness of the case 123 is preferably as small as possible.

The magnet bar 12 is desirably the one that generates a magnetic field having a magnetic flux density of 0.8 T or more in the vicinity of each of the yokes 122 outside the case 123. The magnet bar 12 is more desirably the one that generates a magnetic field of 1 T or more in the vicinity of each of the yokes 122 outside the case 123.

Note that the state of being "aligned in the form of a line" is preferably a state of being aligned in the form of a straight line. However, the state of being "aligned in the form of a line" does not necessarily have to be a state of being aligned in the form of a straight line, and may be a state of being aligned in a curved line or in bend line. In addition, one or more magnet bars 12 may be arranged in a certain location in the transfer path 11.

For example, the magnet bar 12 is configured as below.

The length of the magnet bar 12 in a plane along the separator film 1 is a length such that all of the magnet bars 12 provided in the transfer device 101 can have magnetic field effects on an area from one end to another end of the separator film 1 in the width direction. The length of the magnet bar 12 in the plane along the separator film 1 may be greater than the widthwise length of the separator film 1.

Further, the directions of magnetic poles of each of the magnets 121 are preferably such that respective surfaces, which face each other, of oppositely opposed magnets 121 are identical in polarity to each other (i.e., N poles face each other or S poles face each other.).

The plurality of magnets 121 in the plane along the separator film 1 are provided preferably at a pitch of 1 mm to 50 mm, and more preferably at a pitch of 5 mm to 20 mm. Here, a larger pitch is advantageous in that an area which is subjected to magnetic field effects is easily widened. However, since the magnet bar 12 generates a large magnetic field only in the vicinity of each of the yokes 122, the larger pitch is disadvantageous in that removal of a foreign object is more likely to be missed due to the state of being interspersed with positions where large magnetic fields are generated. The pitch can be determined in consideration of the advantage and disadvantage and is considered to be, for example, 10 mm.

Further, examples of each of the magnets 121 include permanent magnets such as a well-known neodymium magnet, a well-known ferrite magnet, and a well-known samarium cobalt magnet, and an electromagnet. The magnetic flux density of the magnet bar 12 is preferably 4000 gauss or more, more preferably 5000 gauss or more, and even more preferably 9000 gauss or more. The magnetic flux density of the magnet bar 12 is preferably 4000 gauss or more because a magnetic substance can be easily removed. On the other hand, an excessively low magnetic flux density of the magnet bar 12 is not preferable. This is because the necessity arises that a distance between the magnet bar 12 and the separator film 1 must be as close to, for example, less than 1 mm as possible to remove a magnetic substance and thus provides little margin of design. The magnetic flux density of the magnet bar 12 is preferably 20000 gauss or less, and more preferably 15000 gauss or less. A magnetic flux density of the magnet bar 12 of 20000 gauss or less is preferable because it is easy to eliminate a foreign object adhering to the magnet bar 12. On the other hand, an excessively high magnetic flux density of the magnet bar 12 is not preferable for such reasons as difficulty in eliminating a foreign object adhering to the magnet bar 12 and high cost of introducing the magnet bar 12.

(a) of FIG. 3 is a cross-sectional view illustrating a specific configuration example of a magnetic field generation unit 14a. (b) of FIG. 3 is a cross-sectional view illustrating a specific configuration example of a magnetic field generation unit 14b. As illustrated in (a) of FIG. 3, the magnetic field generation unit 14a is configured to include a magnet bar 12 and a cover 13a which surrounds the magnet bar 12 and is made of a non-magnetic substance such as resin, and the magnetic field generation unit 14a is detachably arranged in the transfer path 11. Similarly, as illustrated in (b) of FIG. 3, the magnetic field generation unit 14b is configured to include a magnet bar 12 and a cover 13b which surrounds the magnet bar 12 and is made of a non-magnetic substance such as resin, and the magnetic field generation unit 14b is detachably arranged in the transfer path 11. Hereinafter, the cover 13a and the cover 13b are referred to collectively as a cover 13, and the magnetic field generation unit 14a and the magnetic field generation unit 14b are referred to collectively as a magnetic field generation unit 14.

At the detachment of the magnetic field generation unit 14 from the transfer path 11 or at the attachment of the magnetic field generation unit 14 in the transfer path 11, the cover 13 inhibits the magnetic field generation unit 14 from being strongly adsorbed to another magnetic field generation unit 14 or a member made of a magnetic substance which member constitutes, for example, the transfer path 11.

The magnetic field generation unit 14 preferably has a longitudinal shape that extends in a straight line. Then, in the transfer path 11, a guide 15 is provided for sliding the magnetic field generation unit 14 along a longitudinal direction of the magnetic field generation unit 14 so that the magnetic field generation unit 14 is attached. Thus, the magnetic field generation unit 14 can be easily attached and detached by a sliding operation. The guide 15 is a generic term for a guide 15a and a guide 15b (described later).

The magnetic field generation unit 14a illustrated in (a) of FIG. 3 is a unit to be arranged on a side of an upper surface of the separator film 1 so as to face downward. In such a case, the guide 15a supports the magnetic field generation unit 14a on a side (front side) of the magnetic field generation unit 14a which side is the same as a side thereof facing the separator film 1.

On the contrary, as illustrated in (b) of FIG. 3, the cover 13b of the magnetic field generation unit 14b to be arranged on a side of a lower surface of the separator film 1 so as to face upward differs in shape from the cover 13a. In this situation, the guide 15b supports the magnetic field generation unit 14b on a side (back side) of the magnetic field generation unit 14b which side is opposite to a side facing the separator film 1.

The rigidity of the outer surface of the cover 13 is desirably lower than both the rigidity of the outer surface of the magnet bar 12 (the outer surface of the case 123) and the rigidity of the guide 15. As described above, in a case where the cover 13 is formed of resin and the case 123 is formed of stainless steel, the above-described rigidity relation can be generally realized. Thus, even in a case where, at the detachment of the magnetic field generation unit 14 from the transfer path 11 or at the attachment of the magnetic field generation unit 14 in the transfer path 11, the magnetic field generation unit 14 is attracted by and collides with another magnetic field generation unit 14 or a member made of a magnetic substance which member constitutes, for example, the transfer path 11, it is possible to prevent the occurrence of damage to each part and an injury of an operator. In a case where the cover 13 is formed of metal in the same manner as the guide 15, a metal foreign object may be generated by cutting (rubbing) of metals (the cover 13 and the guide 15) when the magnetic field generation unit 14 is attached or detached by a sliding operation. Realizing the above-described rigidity relation prevents generation of a new metal foreign object. The resin of which the cover 13 is formed may be any resin that realizes the above-described rigidity relation. However, from the viewpoint of having adequate slidability and being less likely to be scraped, the resin is preferably polyamide, polytetrafluoroethylene, polyurethane, and polyolefin, more preferably polyolefin, and particularly preferably ultra-high molecular weight polyethylene.

In addition, the cover 13 has an opening 16 (a generic term for an opening 16a in (a) of FIG. 3 and an opening 16b in (b) of FIG. 3) provided in a portion where the magnet bar 12 faces the separator film 1. This eliminates an unnecessary non-magnetic material in a portion facing the separator film 1, and thus allows the magnet bar 12 and the separator film to come closer together. This makes it possible to effectively eliminate a foreign object made of a magnetic substance. In addition, it is possible to prevent a foreign object from newly adhering to the separator film 1 due to, for example, degradation and falling of a constituent component (e.g., a resin that is likely to peel off and fall off, such as a resin tape) of the cover 13 in the portion facing the separator film 1.

(a) and (b) of FIG. 4 are cross-sectional views each illustrating an example of a method of cleaning the magnet bar 12 mounted into the cover 13. As illustrated in (a) and (b) of FIG. 4, the provision of the opening 16 allows for easy cleaning of the magnet bar 12. Specifically, an adhesive tape 21 is wound around the magnet bar 12 through the opening 16 while the magnet bar 12 is rotated inside the cover 13, as illustrated in (a) of FIG. 4. Then, the wound adhesive tape 21 is peeled off the magnet bar 12, as illustrated in (b) of FIG. 4, so that a foreign object adhering to the magnet bar 12 can be eliminated. Therefore, the cover 13, inside of it, holds the magnet bar 12 such that the magnet bar 12 can rotate about a longitudinal axis of the magnet bar 12.

In this way, the magnet bar 12 requires cleaning to eliminate a foreign object. As such, it is desirable that a spare should be prepared for the magnetic field generation unit 14. Accordingly, even in a case where the magnetic field generation unit 14 is detached for cleaning or other purpose, it is possible to prevent a decrease in operating rate of an apparatus for producing the separator film 1 by attaching the spare and then operating the apparatus.

Although the arrangement, etc. of the magnet bar 12 will be described below, the magnet bar 12 described below may be a magnet bar 12 alone or may be a constituent member of the above-described magnetic field generation unit 14.

[Countermeasures for Magnetic Flux Density Distribution]

As described earlier, in the magnet bar 12, the magnetic flux density is high in the yoke 122 portion where the magnetic flux is concentrated. Conversely, the magnetic flux density is low in a portion between the yokes 122. The low magnetic flux density portion is less effective in eliminating a foreign object in comparison with the high magnetic flux density portion. The low magnetic flux density portion can be narrowed by reducing the thickness of a magnet (thickness in the magnetic pole direction). However, excessive reduction in thickness of the magnet to, for example, less than 1 mm is not realistic because it is difficult to produce the magnet bar 12.

Thus, in order to enhance the foreign object eliminating effect in a wider range in the separator film 1, the magnet bar 12 can be arranged in a manner as described below. Note that depending on the magnet bar 12 to be used, there is a case where even the low magnetic flux density portion can be sufficiently effective in eliminating a foreign object. Thus, the manner of arrangement of the magnet bar 12 described here is a matter that can be appropriately adopted as required.

FIG. 5 is a plan view schematically illustrating a first arrangement example of the magnet bar 12. As illustrated in FIG. 5, the first arrangement example is such that the magnet bar 12 is arranged so as to be inclined with respect to a direction (that is, width direction of the separator film 1; width direction TD in FIG. 5) perpendicular to a transfer direction (transfer direction MD in FIG. 5) of the separator film 1. That is, the axis 12x of the magnet bar 12 is inclined with respect to the width direction TD that corresponds to the width direction of the separator film 1.

Such an arrangement decreases the spacing between the yokes 122 when viewed in the transfer direction of the separator film 1, in comparison with the arrangement of the magnet bar 12 along the perpendicular direction. This allows regions highly effective in eliminating a foreign object to be provided more densely in the width direction of the separator film 1. At this time, it is preferable that the magnet bar 12 is shaped in a straight line, but the magnet bar 12 is not necessarily shaped in a straight line.

FIG. 6 is a plan view schematically illustrating a second arrangement example of the magnet bar 12. In FIG. 6, yokes 122 are transparent (indicated in dashed lines) for the sake of simplicity. As illustrated in FIG. 6, the second arrangement example is such that a plurality of magnet bars 12 are arranged side by side on one surface side of the separator film 1 in the transfer direction of the separator film 1 to compensate for the low magnetic flux density portions with each other. That is, when viewed in the transfer direction of the separator film 1, the magnet bars 12 are arranged such that a yoke 122 of one of the magnet bars 12 is positioned in between two yokes 122 of the other one of the magnet bars 12.

This compensation allows the regions highly effective in eliminating a foreign object to be provided more densely in the width direction of the separator film 1.

The plurality of magnet bars 12 in the second arrangement example need not necessarily be arranged so as to be adjacent to each other. As long as the magnet bars 12 are arranged in a continuous transfer path, other member(s) may be interposed between the magnet bars 12. For example, in FIG. 17 (described later), a relation between two magnet bars 12 (i.e., first magnet bars 12a are in an upstream-downstream relation in the transfer path 11 or second magnet bars 12b in the upstream-downstream relation) may be as in the second arrangement example.

[Arrangement of Magnet Bars in Transfer Path]

Since the separator film 1 has first and second surfaces, individual magnet bars 12 are basically arranged on the first and second surface sides. However, in a case where a foreign object needs to be eliminated from only one of the first and second surfaces for some reason, the magnet bars 12 may be arranged only on one of the first and second surface sides.

Hereinafter, a magnet bar 12 arranged on the first surface side of the separator film 1 is referred to as "first magnet bar 12a" and a magnet bar 12 arranged on the second surface side of the separator film 1 is referred to as "second magnet bar 12b".

FIG. 7 is a plan view schematically illustrating a first arrangement example of the first magnet bar 12a and the second magnet bar 12b. As illustrated in FIG. 7, it is desirable that the first magnet bar 12a and the second magnet bar 12b are arranged at such positions that the first magnet bar 12a and the second magnet bar 12b are displaced from each other in the transfer direction of the separator film 1. This makes it possible to inhibit the occurrence of interference between respective magnetic fields generated by the first magnet bar 12a and the second magnet bar 12b. Therefore, it is possible to inhibit the decrease of the foreign object eliminating effect produced by the first magnet bar 12a and the second magnet bar 12b.

FIG. 8 is a plan view schematically illustrating a second arrangement example of the first magnet bar 12a and the second magnet bar 12b. In FIG. 8, yokes 122 are transparent (indicated in dashed lines) for the sake of simplicity. As illustrated in FIG. 8, the first magnet bar 12a and the second magnet bar 12b may be arranged such that a strong magnetic field area of the second magnet bar 12b (a portion corresponding to a yoke 122) lies in a weak magnetic field area of the first magnet bar 12a (a portion between two yokes 122), when viewed in the transfer direction of the separator film 1. This also makes it possible to inhibit the occurrence of interference between respective magnetic fields generated by the first magnet bar 12a and the second magnet bar 12b, and thus makes it possible to inhibit the decrease of the effect of eliminating a foreign object. This arrangement is particularly useful in a case where the first magnet bar 12a and the second magnet bar 12b cannot be arranged so as to be displaced from each other in the transfer direction of the separator film 1, or in a case where the first magnet bar 12a and the second magnet bar 12b can be arranged so as to be displaced from each other, but the amount of such displacement has to be small.

To eliminate a foreign object made of a magnetic substance from the separator film 1 being transferred by use of the magnet bar 12, the magnet bar 12 needs to be brought close to the surface of the separator film 1. A distance between the magnet bar 12 and the separator film 1 is desirably 1 mm to 20 mm, more desirably 1 mm to 10 mm, even more desirably 2 mm to 10 mm, and further more desirably 2 mm to 8 mm, depending on the magnetic flux density of the magnet bar 12. With decreasing distance between the magnet bar 12 and the separator film 1, the foreign object eliminating effect increases. However, it is desirable that the distance between the magnet bar 12 and the separator film 1 is the above-described distance because, for example, damage to the separator film 1 or breakage of the separator film 1 may be caused when the magnet bar 12 and the separator film 1 come into contact with each other due to wobbling of the separator film 1.

[Arrangement Relationship Between Magnet Bar and Transfer Roller]

To arrange the magnet bar 12 in the transfer path 11 of the separator film 1, an arrangement relationship with respect to a transfer roller provided in the transfer path 11 needs to be taken into consideration.

FIG. 9 is a side view schematically illustrating a first arrangement relationship of the magnet bar 12. A transfer roller 111 illustrated in FIG. 9, provided in the transfer path 11, is the one to come into contact with the first surface of the separator film 1 and carry the separator film 1 in the transfer direction. As illustrated in FIG. 9, the first arrangement relationship can be such that the magnet bar 12 is arranged at a position opposite to the transfer roller 111. The separator film 1 tends to vibrate during transfer due to its small thickness. When the separator film 1 vibrates, a distance between the surface of the separator film 1 and the magnet bar 12 fluctuates. This makes it difficult to maintain a proper foreign object eliminating effect. By arranging the magnet bar 12 at a position opposite to the transfer roller 111, it is possible to prevent the occurrence of the above-described problem.

Further, an outer peripheral member of a transfer roller 111 positioned opposite to the magnet bar 12 is desirably constructed of a non-magnetic substance, e.g., non-magnetic stainless steel. This makes it possible to prevent a magnetic field generated by the magnet bar 12 from being affected by the transfer roller 111. Therefore, it is possible to prevent the decrease of the foreign object eliminating effect produced by the magnet bar 12.

FIG. 10 is a side view schematically illustrating a second arrangement relationship of the magnet bar 12. As illustrated in FIG. 10, the second arrangement relationship can be such that a magnet bar 12 is arranged between transfer rollers 111 adjacent to each other.

That is, in the transfer path 11, a plurality of first transfer rollers 111a are arranged along the transfer direction of the separator film 1, so as to come into contact with the first surface of the separator film 1. The magnet bar 12 is arranged between the plurality of first transfer rollers 111a adjacent to each other. The magnet bar 12 corresponding to the second surface of the separator film 1 is arranged between second transfer rollers 111b in the same manner.

At this time, assuming that the separator film 1 serves as a boundary, the magnet bar 12, as indicated as the first magnet bar 12a and the second magnet bar 12b in FIG. 10, may be arranged on the same side as the transfer rollers. Alternatively, although not illustrated, the magnet bar 12 may be arranged on the side opposite to the transfer rollers.

This arrangement relationship is particularly useful when a magnetic substance is used for the first transfer roller 111a and the second transfer roller 111b themselves or their peripheral members.

The first arrangement relationship and the second arrangement relationship may be employed singly or in combination in one transfer path 11.

[Movement Mechanism for Magnet Bar]

As noted above, the magnet bar 12 needs to be arranged close to the surface of the separator film 1. The separator film 1 has a thickness that is small enough for a distance to the magnet bar 12 and basically has a uniform shape. Therefore, if the separator film 1 does not vibrate during transfer of the separator film 1, the distance between the separator film 1 and the magnet bar 12 is kept constant.

However, in the production of the separator film 1, some part of the separator film 1 may be different in shape from the other parts of the separator film 1, or other member may be attached to a certain part of the separator film 1.

For example, as will be described later, in a case where an original sheet of the separator film 1 is slit by a slitting device, a preceding original sheet and a following original sheet may be joined together by using a tape or the like. Further, marking a certain part of the separator film 1 may be carried out by, for example, adhering a marking tape to that part.

In a case where these parts, i.e. the protruded parts of the separator film 1, pass through a place where the magnet bar 12 is installed, the separator film 1 (or a tape or the like adhered to the separator film 1) may possibly contact with the magnet bar 12 due to a smaller distance from the magnet bar 12 than normal. Such contact may cause defects such as damage to the separator film 1 and re-adhesion of a foreign object to the separator film 1 after the foreign object has been removed from the separator film 1 and adhered to the magnet bar 12.

To inhibit the occurrence of the above-described defects, it is desirable to provide a movement mechanism which allows a distance to the magnet bar 12 from a surface of the separator film 1 which surface faces the magnet bar to be variable. Specific examples of the movement mechanism include, for example, a movement mechanism as described below.

FIG. 11 is a side view schematically illustrating a first specific example of the movement mechanism for the magnet bar 12. As illustrated in FIG. 11, the first specific example is a movement mechanism constituted by a linear movement mechanism which moves the magnet bar 12 (in FIG. 11, the magnetic field generation unit 14a in its entirety) by linear motion. The linear movement mechanism can be, for example, a motor-driven mechanism or a hydraulic-driven mechanism. The mechanism illustrated in FIG. 11 is an air cylinder 17 driven by compressed air. In FIG. 11, the driving direction of the air cylinder 17 (in FIG. 11, a direction indicated by Cy) is a normal direction to the separator film 1. However, the driving direction may be inclined with respect to the normal direction. In FIG. 11, only the movement mechanism for the magnet bar 12 of the magnetic field generation unit 14a is provided. However, a movement mechanism for the magnet bar 12 of the magnetic field generation unit 14b may be provided. FIG. 11 also illustrates an air nozzle 18, which will be described later.

In a case where the movement mechanism is provided on only one side of the separator film 1, the separator film 1 is passed through the transfer path 11 such that a surface of the separator film 1 which surface has a protrusion, e.g. a seam or the like, faces the side on which the movement mechanism is provided. In a case where movement mechanisms are provided on opposite sides of the separator film 1, it is unnecessary to consider which side the seam or the like should face during the passage of the separator film 1.

(a) of FIG. 12 is a side view schematically illustrating a second specific example of the movement mechanism for the magnet bar 12, and (b) of FIG. 12 is a plan view schematically illustrating the second specific example of the movement mechanism for the magnet bar 12. As illustrated in (a) and (b) of FIG. 12, the second specific example is a movement mechanism constituted by a rotation mechanism 19 which moves the magnet bar 12 by rotational motion about a rotation shaft 191 which is parallel to the surface of the separator film 1.

The rotation mechanism 19 includes the rotation shaft 191 and a support 192 for rotating together with the rotation shaft 191 to support the magnet bar 12. The rotation mechanism 19 may further include a motor (not illustrated) for rotating the rotation shaft 191. Alternatively, the rotation mechanism 19 may be rotated manually.

The support 192 supports the magnet bar 12 such that a longitudinal direction of the magnet bar 12 is parallel to the surface of the separator film 1. In (a) and (b) of FIG. 12, the magnet bar 12 is supported at one end by one support 192, but the support 192 and the rotation shaft 191 may be arranged on each side of the magnet bar 12 so that the magnet bar 12 is supported at both ends.

One support 192 may support one magnet bar 12. However, it is desirable that one support 192 supports the first magnet bar 12a and the second magnet bar 12b so that the first magnet bar 12a and the second magnet bar 12b are rotated in an integrated manner. This allows the first magnet bar 12a and the second magnet bar 12b to be moved simultaneously by one rotational motion.

(a) of FIG. 13 is a side view schematically illustrating a variation of the second specific example of the movement mechanism for the magnet bar 12, and (b) of FIG. 13 is a plan view schematically illustrating the variation of the second specific example of the movement mechanism for the magnet bar 12. In this case, the movement mechanism for the magnet bar 12 is arranged such that a center line of the rotation shaft 191 passes through the separator film 1. Further, in a case where the first magnet bar 12a and the second magnet bar 12b are each supported at one end, it is desirable to provide a coupling 193 for coupling the other end of the first magnet bar 12a and the other end of the second magnet bar 12b to each other, wherein the other end of the first magnet bar 12a and the other end of the second magnet bar 12b are opposite to the support 192. This makes it possible to inhibit the deflection of the first magnet bar 12a and the second magnet bar 12b.

Note that in a case where the cover 13 is provided over the first magnet bar 12a as illustrated in (a) and (b) of FIG. 3, it is desirable to first adjust the positional relationship between the separator film 1 and the first magnet bar 12a by a rotational motion with the cover 13 detached, and then place the cover 13 over the first magnet bar 12a. The same applies to the second magnet bar 12b. This makes it easy to adjust a positional relationship between the cover 13 and the separator film 1.

[Foreign Object Removal Assisting Mechanism]

In some cases, a foreign object made of a magnetic substance, adhering to the separator film 1, cannot be removed from the separator film 1 only by the effect of a magnetic field produced by the magnet bar 12, depending on the degree of the adhesion. Therefore, it is desirable to provide an assisting mechanism for assisting in the removal of a foreign object by the magnet bar 12 (hereinafter, sometimes referred to as a foreign object removal assisting mechanism). Here, the "assisting mechanism for assisting in the removal" refers to a mechanism that exerts an action of facilitating the removal. The following description will mainly discuss an air nozzle (gas discharge mechanism) 18 as an aspect of the assisting mechanism.

As illustrated in FIG. 11, the air nozzle 18 assists in removing a foreign object made of a magnetic substance from the separator film 1 by blowing a gas onto the separator film 1. The gas discharged from the air nozzle 18 may be ordinary air or may be other gas. The gas may contain an ionized gas in order to have the effect of eliminating static electricity.

The air nozzle 18 discharges a gas in a direction from a downstream side of the transfer direction of the separator film 1 to a magnet bar 12 side, so that a part of the gas passes through a gap between the separator film 1 and the magnet bar 12. Although the direction in which the gas is discharged is desirably the direction as described above according to the simulation results described later, the gas may be discharged in a direction from an upstream side of the transfer direction of the separator film 1 to the magnet bar 12 side or may be discharged in two directions from the upstream side and from the downstream side to the magnet bar 12 side.

For the air nozzle 18, the magnet bar 12 and the air nozzle 18 may be moved integrally. In other words, a relative positional relationship between the magnet bar 12 and the air nozzle 18 may be maintained constant. That is, the movement mechanism may be a mechanism that moves only the magnet bar 12 (including the magnetic field generation unit 14*a*) as described above or may be a mechanism that integrally moves the magnet bar 12 (including the magnetic field generation unit 14*a*) and the air nozzle 18.

Based on the simulation results shown in (a) and (b) of FIG. 14, (a) and (b) of FIG. 15, and FIG. 16, suitable conditions for the presence or absence, direction, and angle of discharge by the air nozzle 18 will be described. (a) and (b) of FIG. 14 are graphs showing a first simulation result of suitable conditions for the presence or absence of discharge by the air nozzle 18 and the direction of discharge by the air nozzle 18. (a) and (b) of FIG. 15 are graphs showing a second simulation result of a suitable condition for the direction of discharge by the air nozzle 18. FIG. 16 is a graph showing a third simulation result of a suitable condition for the angle of discharge by the air nozzle 18. The conditions of these simulations are as below.

Wall (high-density polyethylene (HDPE); corresponding to the separator film 1)
  Young's modulus: 0.7 GPa
  Poisson ratio: 0.42
  Particles (corresponds to a foreign object; assuming SUS304 debris and defining the following physical properties below)
  Young's Modulus: 210 GPa
  Poisson's ratio: 0.28
  Coefficient of friction between particles: 0.52
  Densities: 7800 kg/m$^3$
  Relative permeability: 30
  Two conditions to be used selectively are: (A) Two 50 μm diameter spherical particles coupled to each other; and (B) two 40 μm diameter spherical particles coupled to each other.
  Between wall and particle
  Friction coefficient: 0.67
  Hamaker constant: $10^{-19}$ J
  Separation distance: 0.4 nm
  Magnetic flux densities of magnet (corresponding to the magnet bar 12): 1 T (10,000 gauss)
  Air Assist (corresponding to the air nozzle 18)
  Four conditions of the discharge angle in the normal direction to the wall surface ((C) 5°, (D) 15°, (E) 30°, and (F)) 45° are used selectively.
  Distance from center of rotation (coordinates (−50, 0) in (a) and (b) of FIG. 14 and (a) and (b) of FIG. 15) to the tip (corresponding to reference numeral 33 in these drawings): 39 mm (coordinates (X, Y) where X is a horizontal axis and Y is a vertical axis in these drawings)
  Air flow rate: $2.3 \times 10^{-4}$ m$^3$/s (one nozzle hole) Nozzle hole size: 4 mm Nozzle outlet wind speed: 18 m/s
  Rate of transfer of the separator film 1: 32 m per minute
  Gravity acceleration: 9.8 m/s$^2$
  Vacuum magnetic permeability: $1.26 \times 10^{-6}$ N/A$^2$
  Air viscosity: $1.82 \times 10^{-5}$ Pa·s (a) of FIG. 14 and (a) of FIG. 15 show examples in which the air nozzle 18 is arranged on the upstream side of the transfer direction of the separator film 1 with respect to the magnetic field generation unit 14. (b) of FIG. 14, (b) of FIG. 15, and FIG. 16 show examples in which the air nozzle 18 is arranged on the downstream side of the transfer direction of the separator film 1 with respect to the magnetic field generation unit 14. The discharge angle of the air nozzle 18 (discharge angle with respect to the normal direction of the plane of the separator film 1) is determined so that the tip of the air nozzle 18 points toward the magnetic field generation unit 14 side.

Further, lines 31 and 32 represent respective contours of the separator film 1 and the magnetic field generation unit 14. Further, an arrow 34 represents discharge (discharge direction) by the air nozzle 18. In addition, (a) and (b) of FIG. 14, and (a) and (b) of FIG. 15 show a large number of particles. Of these particles, particles 35*a* are particles which exhibit a behavior in a case where discharge is not made by the air nozzle 18, and particles 35*b* are particles which exhibit a behavior in a case where discharge is made by the air nozzle 18.

Regarding the simulations in (a) and (b) of FIG. 14, (a) and (b) of FIG. 15, and FIG. 16, calculation was made by applying the discrete element method (DEM) with a contact force, a gravity, an adhesion force, an aerodynamic drag force, and a magnetic force taken into account as forces acting on particles. The contact force, the gravity, the adhesion force, the aerodynamic drag force, and the magnetic force were determined in a manner as described below.

The contact force was determined based on the discrete element method.
The gravity is known.
The adhesion force was expressed by van der Waals force using the Hamaker constant and the separation distance.
The aerodynamic drag force was based on the Stokes equation.
The magnetic force was determined based on Coulomb's law.

(a) and (b) of FIG. 14 show the particle condition (A) and the discharge angle condition (E). According to (a) and (b) of FIG. 14, under the present simulation conditions, each particle 35*a* exhibited a behavior of not being completely removed from the separator film 1, whereas each particle 35*b* was removed from the separator film 1, and the result demonstrating the effect of assisting in the removal was obtained. From this result, it can be seen that the discharge made by the air nozzle 18 is effective in removing each particle from the separator film 1. In other words, it can be seen that the discharge made by the air nozzle 18 assists in the removal of each particle from the separator film 1.

(a) and (b) of FIG. 15 show the particle condition (B) and the discharge angle condition (E). The particles 35*b* in (a) of FIG. 15 are removed from the separator film 1 on the downstream side of the transfer direction of the separator film 1, in comparison with the particles 35*b* in (a) of FIG. 14. That is, in a case where discharge is made by the air nozzle 18 in a direction from the upstream side of the transfer direction of the separator film 1 to the downstream side thereof, there is a possibility that it is less likely to remove small-size particles from the separator film 1. On the other hand, the particles 35*b* in (b) of FIG. 15 are removed from the separator film 1 at substantially the same position as the particles 35*b* in (b) of FIG. 14. That is, the discharge made by the air nozzle 18 in a direction from the downstream side of the transfer direction of the separator film 1 to the upstream side thereof is advantageous in easily removing even small-size particles from the separator film 1.

With all the above things considered, it can be seen that a discharge may be made by the air nozzle 18 in a direction from the upstream side of the transfer direction of the separator film 1 to the downstream side thereof or from the downstream side of the transfer direction of the separator film 1 to the upstream side thereof. However, it can also be seen that the latter is more preferable.

FIG. 16 shows a case where the air nozzle 18 makes a discharge in a direction from the downstream side of the transfer direction of the separator film 1 to the upstream side thereof, under the particle condition (A) and the discharge angle conditions (C) to (F). FIG. 16 also shows a large number of particles, and these particles are indicated as the particles 35*a* described above and particles 35*c* to 35*f* corresponding to the above condition (C) to (F), respectively, if the particles exhibit the behavior when a discharge is made by the air nozzle 18. From the results illustrated in FIG. 16, it can be seen that the larger the discharge angle, the more particles are removed from the separator film 1 on the upstream side of the transfer direction of the separator film 1. In other words, the more parallel the direction of the discharge is to the plane of the separator film 1, the greater the effect of the air nozzle 18 assisting in the removal of the particles.

An example of the air nozzle 18 is described below. That is, for one air nozzle 18, for example, 16 discharge holes (diameter: 4 mm) are provided in a width direction of the separator film 1 (width: 1 m). In addition, the air velocity of the gas in the vicinity of the outlet of each discharge hole is, for example, 18 m/s.

In addition to the above-described air nozzle 18, forms described below may be adopted as the foreign object removal assisting mechanism.

One form is a mechanism which allows a part of the transfer path 11 to be formed as a transfer path that extends along a curved line so that the surface of the separator film 1 which surface faces the magnet bar 12 is convex. Specifically, this mechanism is, for example, a part of the separator film 1 which part faces the first magnet bar 12*a* at the uppermost stream of a transfer path in FIG. 17, which will be described later. This mechanism makes it possible to assist in the removal of a foreign object made of a magnetic substance by a centrifugal force.

Another form is a vibration mechanism which vibrates the separator film 1. As the type of vibration, ultrasonic vibration is desirable. Ultrasonic vibration can provide energy necessary to assist in the removal of a foreign object while keeping its amplitude sufficiently smaller than the gap between the separator film 1 and the magnet bar 12.

In either form, the foreign object removal assisting mechanism desirably causes the energy for assisting in the removal of a foreign object made of a magnetic substance to reach a region opposite to the magnet bar 12 in the separator film 1. By doing so, energy from the foreign object removal assisting mechanism reaches a region where a magnetic field is applied to the separator film 1. This makes it possible to further enhance the effect of eliminating a foreign object made of a magnetic substance.

4. Application Examples of Slitting Device

FIG. 17 is a view illustrating an example of application of the magnet bar 12 to a slitting device 102 for the separator film 1. This section describes an example of application of the magnet bar 12 to the slitting device 102 for the separator film 1 with reference to FIG. 17.

The slitting device 102 is a device for: drawing an original sheet of the separator film 1 (hereinafter referred to simply as "original sheet") out of an original sheet roll 2 which is a roll of the original sheet; while transferring the drawn original sheet, slitting the original sheet along the direction in which the original sheet is transferred into slit pieces of the separator film 1 (hereinafter referred to as "slit films 3"); and separately winding the slit films 3 to form slit film rolls 4. Thus, a path from the original sheet roll 2 to the slit film roll 4 is the transfer path for the separator film 1.

In FIG. 17, a direction of rotation of the original sheet roll 2 when the original sheet is drawn out of the original sheet roll 2 may be a clockwise direction or may be a counterclockwise direction (indicated by a broken line), but is assumed here to be the clockwise direction. In FIG. 17, a direction of rotation of the slit film rolls 4 when the slit films 3 are wound into the slit film rolls 4 may also be a clockwise direction (indicated by a broken line) or may be a counterclockwise direction, but is assumed here to be the counterclockwise direction.

In the state of the original sheet roll 2, an inner surface of the separator film 1 is referred to as a first surface, and the outer surface of the separator film 1 is referred to as a second surface. Transfer rollers 111 which come into contact with the first surface and the second surface (except for nip rollers 40 and nip rollers 41 and a slit roller 422, which will be described later) are referred to as a first transfer roller 111*a* and a second transfer roller 111*b*, respectively. Magnet bars 12 arranged on the side of the first transfer roller 111*a* and magnet bars 12 arranged on the side of the second transfer roller 111*b* are referred to as first magnet bars 12*a* and second magnet bars 12*b*, respectively.

In the transfer path of the slitting device 102, the nip rollers 40 and the nip rollers 41 are provided. Between the nip rollers 40, the separator film 1 is sandwiched on the first and second surface sides thereof. Between the nip rollers 41, the separator film 1 is sandwiched on the first and second surface sides thereof. These nip rollers 40 and 41 apply, to the separator film 1, driving forces for transferring the separator film 1. The first magnet bars 12*a* and the second magnet bars 12*b* are arranged upstream of the nip rollers 40 and the nip rollers 41.

This enables foreign objects made of a magnetic substance to be eliminated by the magnet bar 12 before the foreign object is pressure-bonded to the surfaces of the separator film 1 by the nip rollers 40 and 41. Thus, it is possible to prevent the decrease of the foreign object eliminating effect produced by the magnet bar 12.

Although FIG. 17 illustrates a partially simplified configuration, the first magnet bars 12*a* and the second magnet bars 12*b* arranged upstream of the nip rollers 40 and may be provided together with the above-described movement mechanism and/or the above-described foreign object removal assisting mechanism.

In addition, in the transfer path of the slitting device 102, a slitting section 42 for slitting the separator film 1 is provided. The slitting section 42 is constituted by a slitting blade 421 and a slitting roller 422 for supporting the separator film 1 on the back of the slitting blade 421. The first magnet bars 12*a* and the second magnet bars 12*b* are also arranged downstream of the slitting section 42.

The slitting section 42 is likely to generate a metal foreign object including a magnetic substance. By arranging the first magnet bars 12*a* and the second magnet bars 12*b* downstream of the slitting section 42, it is possible to prevent foreign objects made of a magnetic substance from remaining adhered to the first and second surfaces of the separator film 1.

Although FIG. 17 illustrates a partially simplified configuration, the first magnet bars 12a and the second magnet bars 12b arranged downstream of the slitting section may be provided together with the above-described movement mechanism and/or the above-described foreign object removal assisting mechanism.

In addition, it is preferable that in the transfer path of the slitting device 102, a foreign object detecting section which detects a foreign object adhering to the separator film is provided. The foreign object detecting section is arranged downstream of the first magnet bars 12a and the second magnet bars 12b and upstream of the slit film rolls 4.

This configuration enables foreign object detection to be carried out after as many foreign objects as possible have been eliminated by the first magnet bars 12a and the second magnet bars 12b. Thus, it is possible to carry out more reasonable detection.

In addition, in the transfer path of the slitting device 102, touch rollers 44 corresponding one-to-one to the slit film rolls 4 may be provided. Each of the touch rollers 44 has a function of pressing a corresponding one of the slit films 3 against a rim of a corresponding one of the slit film rolls 4 in order to prevent the slit films 3 to be formed into the corresponding slit film rolls 4 from being wobbled or deviated.

Examples of application of the magnet bar 12 to the slitting device 102 have been described above. However, the magnet bar 12 may be applied to the aforementioned steps in the process for producing the separator film 1 as well as to the slitting device 102. For example, the magnet bar 12 may be applied to a process for producing a laminated film in which a heat-resistant layer is formed through the coating step as described above. That is, by applying the magnet bar 12 to a laminated film original sheet, it is possible to eliminate a foreign object which has been newly mixed in the coating step. Meanwhile, by applying the magnet bar 12 to at least a coating-side surface of a porous film prior to coating, it is possible to prevent a foreign object from entering in between the heat-resistant layer and the porous film. In a case where heat-resistant layers are formed on opposite surfaces of the porous film by coating, the magnet bar 12 is preferably applied to the opposite surfaces of the porous film. In a case where a foreign object enters in between the heat-resistant layer and the porous film, it is very difficult to eliminate such a foreign object after the laminated film is completed through the coating step. In view of this, it is preferable to apply the magnet bar 12 prior to coating in the production of the laminate film. Thus, by eliminating foreign objects in at least one of the steps or in two or more of the steps, it is possible to prevent residual foreign objects from being left.

In addition, by applying a magnet bar 12 in a form obtained by each of the above-described structures which are preferably further applied to the transfer device 101 or by an appropriate combination of two or more of these structures, it is possible to eliminate a foreign object even from a film, like the separator film 1, produced and transferred at a high speed. The present embodiment also enables the elimination of a foreign object from a separator film 1 which is produced and transferred at a speed as high as, for example, 5 m to 200 m per minute, preferably 10 m to 180 m per minute, as a transfer speed of the separator film 1.

The slit films 3 or slit film rolls 4 obtained through any one of the above embodiments may be irradiated with X-rays to carry out X-ray examination. By carrying out the X-ray examination, it is possible to check for the absence of foreign objects in the slit films 3 or the slit film rolls 4.

Aspects of the present invention can also be expressed as follows:

A nonaqueous electrolyte secondary battery separator film transfer device according to an aspect of the present invention includes: a transfer path through which a nonaqueous electrolyte secondary battery separator film is transferred; a first magnetic field generation source which is arranged in the transfer path and generates a magnetic field for removing, from the separator film being transferred, a magnetic substance adhering to a first surface of the separator film; and a movement mechanism which allows a distance to the first magnetic field generation source from the first surface of the separator film to be variable.

Further, a method for producing a nonaqueous electrolyte secondary battery separator film according to an aspect of the present invention includes: a transferring step of transferring a nonaqueous electrolyte secondary battery separator film; a first foreign object eliminating step of bringing a first magnetic field generation source close to a first surface of the separator film being transferred and then removing a magnetic substance adhering to the first surface of the separator film from the separator film so that the magnetic substance is eliminated; and a retracting step of retracting the first magnetic field generation source when the separator film is likely to come into contact with the first magnetic field generation source.

To eliminate a foreign object made of a magnetic substance from the separator film being transferred by use of the first magnetic field generation source, the first magnetic field generation source needs to be brought close to the surface of the separator film. As a result, during the passage of a protruded part of the separator film such as a seam of the separator film, the protruded portion can come into contact with the first magnetic field generation source. This may cause damage to the separator film and re-adhesion of the removed magnetic substance to the separator film.

In the above-described configuration, the provision of the movement mechanism or the retraction of the first magnetic field generation source can prevent the occurrence of such defects.

The nonaqueous electrolyte secondary battery separator film transfer device according to an aspect of the present invention is preferably such that the movement mechanism is a linear movement mechanism which moves the first magnetic field generation source by linear motion.

The method for producing a nonaqueous electrolyte secondary battery separator film according to an aspect of the present invention is preferably such that in the retracting step, the first magnetic field generation source is retracted by linear motion.

The nonaqueous electrolyte secondary battery separator film transfer device according to an aspect of the present invention is preferably such that the movement mechanism is a rotation mechanism which moves the first magnetic field generation source by rotational motion about a rotation shaft which is parallel to a surface of the separator film.

Further, the method for producing a nonaqueous electrolyte secondary battery separator film according to an aspect of the present invention is preferably such that in the retraction step, the first magnetic field generation source is retracted by rotational motion about a rotation shaft which is parallel to a surface of the separator film.

The nonaqueous electrolyte secondary battery separator film transfer device according to an aspect of the present invention preferably further includes: a second magnetic field generation source which is arranged in the transfer path and generates a magnetic field for removing, from the separator film being transferred, a magnetic substance adhering to a second surface of the separator film, the rotation mechanism causing the first and second magnetic field generation sources to be rotated in an integrated manner.

Further, the method for producing a nonaqueous electrolyte secondary battery separator film according to an aspect of the present invention, preferably further includes: a second foreign object eliminating step of bringing a second magnetic field generation source close to a second surface of the separator film being transferred and then removing a magnetic substance adhering to the second surface of the separator film from the separator film so that the magnetic substance is eliminated, in the retracting step, causing the first and second magnetic field generation sources to be rotated in an integrated manner.

The above-described configuration eliminates the need to provide separate movement mechanisms corresponding one-to-one to the first and second magnetic field generation sources.

The nonaqueous electrolyte secondary battery separator film transfer device according to an aspect of the present invention is preferably such that the first magnetic field generation source is one magnet bar or a plurality of magnet bars each of which is configured such that a plurality of magnets and a plurality of yokes interposed between the magnets are aligned in a form of a line in a plane along the separator film.

Further, the method for producing a nonaqueous electrolyte secondary battery separator film according to an aspect of the present invention is preferably such that the first magnetic field generation source is one magnet bar or a plurality of magnet bars each of which is configured such that a plurality of magnets and a plurality of yokes interposed between the magnets are aligned in a form of a line in a plane along the separator film.

The above-described configuration enables a magnetic flux to be concentrated in a portion in the vicinities of the yokes due to the interposition of the yokes. This makes it possible to enhance the effect of eliminating a foreign object in the portion where the magnetic flux is concentrated.

Note that the state of being "aligned in the form of a line" is preferably a state of being aligned in the form of a straight line. However, the state of being "aligned in the form of a line" is not necessarily limited to a state of being aligned in the form of a straight line.

The nonaqueous electrolyte secondary battery separator film transfer device according to an aspect of the present invention is preferably such that the one magnet bar or at least one of the plurality of magnet bars is arranged such that a direction of the alignment in the form of a line is inclined with respect to a direction perpendicular to a direction in which the separator film is transferred.

Further, the method for producing a nonaqueous electrolyte secondary battery separator film according to an aspect of the present invention is preferably such that the one magnet bar or at least one of the plurality of magnet bars is arranged such that a direction of the alignment in the form of a line is inclined with respect to a direction perpendicular to a direction in which the separator film is transferred.

As described above, the arrangement of the magnet bar in which the magnet bar is inclined decreases a spacing between the yokes when viewed in the transfer direction of the separator film, in comparison with the arrangement of the magnet bar in which the magnet bar is not inclined. This allows regions highly effective in eliminating a foreign object to be provided more densely in the width direction of the separator film.

The nonaqueous electrolyte secondary battery separator film transfer device according to an aspect of the present invention is preferably such that at least two of the plurality of magnet bars are arranged side by side on one surface side of the separator film in the direction in which the separator film is transferred, and are arranged such that a yoke of one of the at least two magnet bars is positioned in a spacing between yokes of the other one of the at least two magnet bars, when viewed in the direction in which the separator film is transferred.

Further, the method for producing a nonaqueous electrolyte secondary battery separator film according to an aspect of the present invention is preferably such that at least two of the plurality of magnet bars are arranged side by side on one surface side of the separator film in the direction in which the separator film is transferred, and are arranged such that a yoke of one of the at least two magnet bars is positioned in a spacing between yokes of the other one of the at least two magnet bars, when viewed in the direction in which the separator film is transferred.

In the above-described configuration, when viewed in the direction in which the separator film is transferred, the spacing between the yokes of the other one of the at least two magnet bars is complemented by the yoke of one of the at least two magnet bars. This allows the regions highly effective in eliminating a foreign object to be provided more densely in the width direction of the separator film.

A nonaqueous electrolyte secondary battery separator film transfer device according to an aspect of the present invention includes: a transfer path through which a nonaqueous electrolyte secondary battery separator film is transferred; and first and second magnetic field generation sources which are arranged in the transfer path on respective sides of first and second surfaces of the separator film, and generate magnetic fields for removing, from the separator film being transferred, magnetic substances adhering to the separator film.

Further, a method for producing a nonaqueous electrolyte secondary battery separator film according to an aspect of the present invention includes: a transferring step of transferring a nonaqueous electrolyte secondary battery separator film; and a foreign object eliminating step of bringing the first and second magnetic field generation sources close to the first and second surfaces of the separator film being transferred, respectively, and then removing magnetic substances adhering to the first and second surfaces of the separator film from the separator film so that the magnetic substances are eliminated.

The above-described configuration enables elimination of foreign objects made of magnetic substances from both sides of the separator film being transferred.

The nonaqueous electrolyte secondary battery separator film transfer device according to an aspect of the present invention is preferably such that the first and second magnetic field generation sources are arranged at such positions that the first and second magnetic field generation sources are displaced from each other in a direction in which the separator film is transferred.

Further, the method for producing a nonaqueous electrolyte secondary battery separator film according to an aspect of the present invention is preferably such that the first and second magnetic field generation sources are arranged at such positions that the first and second magnetic field generation sources are displaced from each other in a direction in which the separator film is transferred.

The above-described configuration makes it possible to inhibit the occurrence of interference between respective magnetic fields generated by the first and second magnetic field generation sources. Therefore, it is possible to inhibit the decrease of the foreign object eliminating effect produced by the first and second magnetic field generation sources.

The nonaqueous electrolyte secondary battery separator film transfer device according to an aspect of the present invention is preferably such that the first and second magnetic field generation sources each generate magnetic fields in a manner such that strong magnetic fields and weak magnetic fields are distributed in an alternate manner in a direction orthogonal to the direction in which the separator film is transferred, and the first and second magnetic field generation sources are arranged such that a strong magnetic field area of the second magnetic field generation source lies in a weak magnetic field area of the first magnetic field generation source, when viewed in the direction in which the separator film is transferred.

Further, the method for producing a nonaqueous electrolyte secondary battery separator film according to an aspect of the present invention is preferably such that the first and second magnetic field generation sources each generate magnetic fields in a manner such that strong magnetic fields and weak magnetic fields are distributed in an alternate manner in a direction orthogonal to the direction in which the separator film is transferred, and the first and second magnetic field generation sources are arranged such that a strong magnetic field area of the second magnetic field generation source lies in a weak magnetic field area of the first magnetic field generation source, when viewed in the direction in which the separator film is transferred.

The above-described configuration makes it possible to inhibit the occurrence of interference between respective magnetic fields generated by the first and second magnetic field generation sources. Therefore, it is possible to inhibit the decrease of the foreign object eliminating effect produced by the first and second magnetic field generation sources.

The nonaqueous electrolyte secondary battery separator film transfer device according to an aspect of the present invention is preferably such that a first transfer roller is provided in the transfer path so as to come into contact with a first surface of the separator film, and the second magnetic field generation source is arranged at a position opposite to the first transfer roller.

Further, the method for producing a nonaqueous electrolyte secondary battery separator film according to an aspect of the present invention is preferably such that a first transfer roller is provided in a transfer path through which the separator film is transferred, so as to come into contact with a first surface of the separator film, and the second magnetic field generation source is arranged at a position opposite to the first transfer roller.

The nonaqueous electrolyte secondary battery separator film tends to vibrate during transfer due to its small thickness. When the separator film vibrates, a distance between the surface of the separator film and the magnetic field generation source fluctuates. This makes it difficult to maintain a proper foreign object eliminating effect. By arranging the magnetic field generation source at a position opposite to the transfer roller, it is possible to prevent the occurrence of the above-described problem.

The nonaqueous electrolyte secondary battery separator film transfer device according to an aspect of the present invention is preferably such that a second transfer roller is provided in the transfer path so as to come into contact with a second surface of the separator film, and the first magnetic field generation source is arranged at a position opposite to the second transfer roller.

Further, the method for producing a nonaqueous electrolyte secondary battery separator film according to an aspect of the present invention is preferably such that a second transfer roller is provided in the transfer path so as to come into contact with a second surface of the separator film, and the first magnetic field generation source is arranged at a position opposite to the second transfer roller.

The above-described configuration enables the above-described effect to be yielded on both surfaces of the separator film.

The nonaqueous electrolyte secondary battery separator film transfer device according to an aspect of the present invention is preferably such that the first and second transfer rollers come into contact with the first and second surfaces of the separator film, respectively, and have respective outer peripheral members which are constructed of a non-magnetic substance.

Further, the method for producing a nonaqueous electrolyte secondary battery separator film according to an aspect of the present invention is preferably such that the first and second transfer rollers come into contact with the first and second surfaces of the separator film, respectively, and have respective outer peripheral members which are constructed of a non-magnetic substance.

The above-described configuration makes it possible to prevent magnetic fields generated by the magnetic field generation sources from being affected by the first and second transfer rollers. Therefore, it is possible to prevent the decrease of the foreign object eliminating effect produced by the first and second magnetic field generation sources.

The nonaqueous electrolyte secondary battery separator film transfer device according to an aspect of the present invention is preferably such that, in the transfer path, a plurality of first transfer rollers are arranged, along the direction in which the separator film is transferred, so as to come into contact with the first surface of the separator film, and the first magnetic field generation source is arranged between the plurality of first transfer rollers adjacent to each other.

Further, the method for producing a nonaqueous electrolyte secondary battery separator film according to an aspect of the present invention is preferably such that, in a transfer path through which the separator film is transferred, a plurality of first transfer rollers are arranged, along the direction in which the separator film is transferred, so as to come into contact with the first surface of the separator film, and the first magnetic field generation source is arranged between the plurality of first transfer rollers adjacent to each other.

The above-described configuration makes it possible to prevent magnetic fields generated by the magnetic field generation source from being affected by the first transfer roller (because a magnetic substance can be used for the first transfer roller itself or its peripheral member). Therefore, it is possible to prevent the decrease of the foreign object eliminating effect produced by the first magnetic field generation source.

The nonaqueous electrolyte secondary battery separator film transfer device according to an aspect of the present invention is preferably such that, in the transfer path, a plurality of second transfer rollers are arranged, along the direction in which the separator film is transferred, so as to come into contact with the second surface of the separator film, and the second magnetic field generation source is arranged between the plurality of second transfer rollers adjacent to each other.

Further, the method for producing a nonaqueous electrolyte secondary battery separator film according to an aspect of the present invention is preferably such that, in the transfer path, a plurality of second transfer rollers are arranged, along the direction in which the separator film is transferred, so as to come into contact with the second surface of the separator film, and the second magnetic field generation source is arranged between the plurality of second transfer rollers adjacent to each other.

The above-described configuration also enables preventing the decrease of the foreign object eliminating effect produced by the second magnetic field generation source.

The nonaqueous electrolyte secondary battery separator film transfer device according to an aspect of the present invention is preferably such that a slitting section configured to slit the separator film along the direction in which the separator film is transferred is provided somewhere in the transfer path, and at least one of the first and second magnetic field generation sources is arranged downstream of the slitting section.

Further, the method for producing a nonaqueous electrolyte secondary battery separator film according to an aspect of the present invention is preferably such that a slitting section configured to slit the separator film along the direction in which the separator film is transferred is provided somewhere in a transfer path through which the separator film is transferred, and at least one of the first and second magnetic field generation sources is arranged downstream of the slitting section.

The slitting section is likely to generate a metal foreign object including a magnetic substance. By arranging at least one of the first and second magnetic field generation sources downstream of the slitting section, it is possible to prevent a foreign object made of a magnetic substance from remaining adhered to at least one of the first and second surfaces of the separator film.

The nonaqueous electrolyte secondary battery separator film transfer device according to an aspect of the present invention is preferably such that another one of the first and second magnetic field generation sources is arranged downstream of the slitting section.

Further, the method for producing a nonaqueous electrolyte secondary battery separator film according to an aspect of the present invention is preferably such that another one of the first and second magnetic field generation sources is arranged downstream of the slitting section.

The above-described configuration enables the above-described effect to be yielded on both surfaces of the separator film.

The nonaqueous electrolyte secondary battery separator film transfer device according to an aspect of the present invention is preferably such that a foreign object detecting section configured to detect a foreign object adhering to the separator film is provided somewhere in the transfer path, and at least one of the first and second magnetic field generation sources is arranged upstream of the foreign object detecting section.

Further, the method for producing a nonaqueous electrolyte secondary battery separator film according to an aspect of the present invention is preferably such that a foreign object detecting section configured to detect a foreign object adhering to the separator film is provided somewhere in a transfer path through which the separator film is transferred, and at least one of the first and second magnetic field generation sources is arranged upstream of the foreign object detecting section.

The above-described configuration enables foreign object detection to be carried out after as many foreign objects as possible have been eliminated by the first and second magnetic field generation sources. Thus, it is possible to carry out more reasonable detection.

The nonaqueous electrolyte secondary battery separator film transfer device according to an aspect of the present invention is preferably such that in the transfer path, nip rollers between which the separator film is sandwiched on first and second surface sides of the separator film are provided, and at least one of the first and second magnetic field generation sources is arranged upstream of the nip rollers.

Further, the method for producing a nonaqueous electrolyte secondary battery separator film according to an aspect of the present invention is preferably such that, in a transfer path through which the separator film is transferred, nip rollers between which the separator film is sandwiched on first and second surface sides of the separator film are provided, and at least one of the first and second magnetic field generation sources is arranged upstream of the nip rollers.

The above-described configuration enables a magnetic substance to be eliminated by the magnetic field generation source before the magnetic substance is pressure-bonded to the surface(s) of the separator film by the nip rollers. Thus, it is possible to prevent the decrease of the foreign object eliminating effect produced by the magnetic field generation source.

A nonaqueous electrolyte secondary battery separator film transfer device according to an aspect of the present invention includes: a transfer path through which a nonaqueous electrolyte secondary battery separator film is transferred; and a magnetic field generation unit including: a magnetic field generation source which generates a magnetic field for removing, from the separator film being transferred, a magnetic substance adhering to the separator film; and a cover which surrounds the magnetic field generation source and is made of a non-magnetic substance, the magnetic field generation unit being detachably arranged in the transfer path.

Further, a method for producing a nonaqueous electrolyte secondary battery separator film according to an aspect of the present invention includes: a transferring step of transferring a nonaqueous electrolyte secondary battery separator film; and a foreign object eliminating step of bringing a magnetic field generation unit close to a surface of the separator film being transferred and then removing a magnetic substance adhering to the surface of the separator film from the separator film so that the magnetic substance is eliminated, the magnetic field generation unit including: a magnetic field generation source which generates a magnetic field for removing the magnetic substance from the separator film; and a cover which surrounds the magnetic field generation source and is made of a non-magnetic substance, the magnetic field generation unit being detachably arranged in a transfer path through which the separator film is transferred.

The above-described configuration enables the presence of the cover to inhibit the magnetic field generation unit from being strongly adsorbed to another magnetic field generation unit or a member made of a magnetic substance which member constitutes, for example, the transfer path, at the detachment of the magnetic field generation unit from the transfer path or at the attachment of the magnetic field generation unit in the transfer path.

The nonaqueous electrolyte secondary battery separator film transfer device according to an aspect of the present invention is preferably such that the magnetic field generation unit has a longitudinal shape that extends in a straight line, and a guide is provided, in the transfer path, for sliding the magnetic field generation unit along a longitudinal direction of the magnetic field generation unit so that the magnetic field generation unit is attached.

The above-described configuration enables the magnetic field generation unit to be easily attached and detached by a sliding operation.

The nonaqueous electrolyte secondary battery separator film transfer device according to an aspect of the present invention is preferably such that the guide supports the magnetic field generation unit on a side of the magnetic field generation unit which side is opposite to a side thereof facing the separator film.

The above-described configuration enables the magnetic field generation unit to be arranged on a side of a lower surface of the separator film so as to face upward.

The nonaqueous electrolyte secondary battery separator film transfer device according to an aspect of the present invention is preferably such that the guide supports the magnetic field generation unit on a side of the magnetic field generation unit which side is the same as a side thereof facing the separator film.

The above-described configuration enables the magnetic field generation unit to be arranged on a side of an upper surface of the separator film so as to face downward.

The nonaqueous electrolyte secondary battery separator film transfer device according to an aspect of the present invention is preferably such that the cover has an outer surface which is lower in rigidity than an outer surface of the magnetic field generation source.

With the above-described configuration, even in a case where, at the detachment of the magnetic field generation unit from the transfer path or at the attachment of the magnetic field generation unit in the transfer path, the magnetic field generation unit is attracted by and collides with another magnetic field generation unit or a member made of a magnetic substance which member constitutes, for example, the transfer path, it is possible to prevent the occurrence of damage to each part and an injury of an operator.

The nonaqueous electrolyte secondary battery separator film transfer device according to an aspect of the present invention is preferably such that another magnetic field generation unit is provided as a spare of the magnetic field generation unit.

In the above-described configuration, even in a case where the magnetic field generation unit is detached for cleaning or other purpose, it is possible to prevent a decrease in operating rate of a nonaqueous electrolyte secondary battery separator film transfer device by attaching the spare and then operating the device.

The nonaqueous electrolyte secondary battery separator film transfer device according to an aspect of the present invention is preferably such that the cover has an opening provided in a portion where the magnetic field generation source faces the separator film, and the cover surrounds a portion other than the portion where the magnetic field generation source faces the separator film.

In the above configuration, the presence of the opening eliminates an unnecessary non-magnetic material in a portion facing the separator film, and thus allows the magnetic field generation source and the separator film to come closer together. This makes it possible to effectively eliminate a foreign object made of a magnetic substance.

The nonaqueous electrolyte secondary battery separator film transfer device according to an aspect of the present invention is preferably such that the magnetic field generation source has a longitudinal shape that extends in a straight line, and the cover, inside of it, holds the magnetic field generation source such that the magnetic field generation source is rotatable about a longitudinal axis of the magnetic field generation source.

In the above-described configuration, an adhesive tape is wound around the magnetic field generation source through the opening while the magnetic field generation source is rotated, and the wound adhesive tape is peeled off the magnetic field generation source, so that a foreign object adhering to the magnetic field generation source can be eliminated. This makes it easier to clean the magnetic field generation source.

A nonaqueous electrolyte secondary battery separator film transfer device according to an aspect of the present invention includes: a transfer path through which a nonaqueous electrolyte secondary battery separator film is transferred; a magnetic field generation source which is arranged in the transfer path and generates a magnetic field for removing, from the separator film being transferred, a magnetic substance adhering to the separator film; and an assisting mechanism which assists in the removal of the magnetic substance by the magnetic field generation source.

Further, a method for producing a nonaqueous electrolyte secondary battery separator film according to an aspect of the present invention includes: a transferring step of transferring a nonaqueous electrolyte secondary battery separator film; a foreign object eliminating step of bringing a magnetic field generation source close to a surface of the separator film being transferred and then removing a magnetic substance adhering to the surface of the separator film from the separator film so that the magnetic substance is eliminated; and an assisting step of assisting in the removal of the magnetic substance by the magnetic field generation source.

With the above-described configuration, it is possible to enhance the effect of eliminating a foreign object made of a magnetic substance from the separator film being transferred. Note that the "assisting mechanism which assists in the removal (assisting step of assisting in the removal)" refers to a mechanism (step) that exerts an action of facilitating the removal.

The nonaqueous electrolyte secondary battery separator film transfer device according to an aspect of the present invention is preferably such that the assisting mechanism is a gas discharge mechanism which assists in the removal of the magnetic substance by blowing a gas onto the separator film.

Further, the method for producing a nonaqueous electrolyte secondary battery separator film according to an aspect of the present invention is preferably that, in the assisting step, the removal of the magnetic substance is assisted in by blowing a gas onto the separator film.

In the above-described configuration, it is possible to assist in the removal of a magnetic substance by a wind pressure caused by the flow of the gas.

The nonaqueous electrolyte secondary battery separator film transfer device according to an aspect of the present invention is preferably such that the gas discharge mechanism discharges a gas in a direction from an upstream side and/or a downstream side of the transfer direction of the separator film to a side of the magnetic field generation source.

The method for producing a nonaqueous electrolyte secondary battery separator film according to an aspect of the present invention is preferably that, in the assisting step, the gas is discharged in a direction from an upstream side and/or a downstream side of the transfer direction of the separator film to a side of the magnetic field generation source.

In the above-described configuration, it is preferable to discharge the gas in a direction from the downstream side because the effect of assisting in the removal is likely to be increased.

The nonaqueous electrolyte secondary battery separator film transfer device according to an aspect of the present invention preferably further includes: a movement mechanism which allows a distance to the magnetic field generation source from the separator film to be variable, the movement mechanism integrally moving the magnetic field generation source and the gas discharge mechanism.

Further, the method for producing a nonaqueous electrolyte secondary battery separator film according to an aspect of the present invention preferably includes: a moving step of allowing a distance to the magnetic field generation source from the separator film to be variable, in the moving step, integrally moving the magnetic field generation source and a mechanism which discharges the gas.

The above-described configuration enables the magnetic field generation source and the mechanism which discharges the gas to be moved while maintaining a relative positional relationship between the magnetic field generation source and the mechanism that discharges the gas.

The nonaqueous electrolyte secondary battery separator film transfer device according to an aspect of the present invention is preferably such that the assisting mechanism is a mechanism which allows a part of the transfer path to be a transfer path that extends along a curved line so that the surface of the separator film which surface faces the magnetic field generation source is convex.

Further, the method for producing a nonaqueous electrolyte secondary battery separator film according to an aspect of the present invention is preferably such that, in the assisting step, a part of a transfer path through which the separator film is transferred is formed as a transfer path that extends along a curved line so that the surface of the separator film which surface faces the magnetic field generation source is convex.

The above-described configuration makes it possible to assist in the removal of a magnetic substance by a centrifugal force.

The nonaqueous electrolyte secondary battery separator film transfer device according to an aspect of the present invention is preferably such that the assisting mechanism is a vibration mechanism which vibrates the separator film.

Further, the method for producing a nonaqueous electrolyte secondary battery separator film according to an aspect of the present invention is preferably such that, in the assisting step, the separator film is vibrated.

The above-described configuration makes it possible to assist in the removal of a magnetic substance by vibration (e.g., ultrasonic vibration).

The nonaqueous electrolyte secondary battery separator film transfer device according to an aspect of the present invention is preferably such that the assisting mechanism causes energy for assisting in the removal of the magnetic substance to reach a region opposite to the magnetic field generation source in the separator film.

Further, the method for producing a nonaqueous electrolyte secondary battery separator film according to an aspect of the present invention is preferably such that, in the assisting step, energy for assisting in the removal of the magnetic substance is caused to reach a region opposite to the magnetic field generation source in the separator film.

The above-described configuration allows the energy from the assisting mechanism (by the assisting step) to reach the region to which a magnetic field is applied in the separator film. This makes it possible to further enhance the effect of eliminating a foreign object made of a magnetic substance.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Separator film
11: Transfer path
12: Magnet bar
12a: First magnet bar
12b: Second magnet bar
13, 13a, and 13b: Cover
14, 14a, and 14b: Magnetic field generation unit
15, 15a, and 15b: Guide
16, 16a, and 16b: Opening
17: Air cylinder (movement mechanism, linear movement mechanism)
18: Air nozzle (assisting mechanism, gas discharge mechanism)
19: Rotation mechanism (movement mechanism)
40, 41: Nip roller
42: Slitting section
101: Transfer device (nonaqueous electrolyte secondary battery separator film transfer device)
102: Slitting device
111: Transfer Roller
111a: First transfer roller
111b: Second transfer roller
121: Magnet
122: Yoke
123: Case
191: Rotation shaft

The invention claimed is:

1. A nonaqueous electrolyte secondary battery separator film transfer device comprising:
a transfer path through which a nonaqueous electrolyte secondary battery separator film is transferred;
a first magnetic field generation source which is arranged in the transfer path and generates a magnetic field for removing, from the separator film being transferred, a magnetic substance adhering to a first surface of the separator film; and
a movement mechanism which allows a distance to the first magnetic field generation source from the first surface of the separator film to be variable,
wherein the movement mechanism is a rotation mechanism which moves the first magnetic field generation source by rotational motion about a rotation shaft which is parallel to a surface of the separator film.

2. The nonaqueous electrolyte secondary battery separator film transfer device as set forth in claim 1, further comprising:
a second magnetic field generation source which is arranged in the transfer path and generates a magnetic field for removing, from the separator film being transferred, a magnetic substance adhering to a second surface of the separator film,
the rotation mechanism causing the first and second magnetic field generation sources to be rotated in an integrated manner.

3. The nonaqueous electrolyte secondary battery separator film transfer device as set forth in claim 1, wherein the first magnetic field generation source is one magnet bar or a plurality of magnet bars each of which is configured such that a plurality of magnets and a plurality of yokes interposed between the magnets are aligned in a form of a line in a plane along the separator film, and
the one magnet bar or at least one of the plurality of magnet bars is arranged such that a direction of the alignment in the form of a line is inclined with respect to a direction perpendicular to a direction in which the separator film is transferred.

4. The nonaqueous electrolyte secondary battery separator film transfer device as set forth in claim 1, wherein the first magnetic field generation source is one magnet bar or a plurality of magnet bars each of which is configured such that a plurality of magnets and a plurality of yokes interposed between the magnets are aligned in a form of a line in a plane along the separator film, and
at least two of the plurality of magnet bars are arranged side by side on one surface side of the separator film in the direction in which the separator film is transferred, and are arranged such that a yoke of one of the at least two magnet bars is positioned in a spacing between yokes of the other one of the at least two magnet bars, when viewed in the direction in which the separator film is transferred.

5. A nonaqueous electrolyte secondary battery separator film transfer device comprising:
a transfer path through which a nonaqueous electrolyte secondary battery separator film is transferred; and
first and second magnetic field generation sources which are arranged in the transfer path on respective sides of first and second surfaces of the separator film, and generate magnetic fields for removing, from the separator film being transferred, magnetic substances adhering to the separator film,
wherein the first and second magnetic field generation sources each generate magnetic fields in a manner such that strong magnetic fields and weak magnetic fields are distributed in an alternate manner in a direction orthogonal to the direction in which the separator film is transferred, and the first and second magnetic field generation sources are arranged such that a strong magnetic field area of the second magnetic field generation source lies in a weak magnetic field area of the first magnetic field generation source, when viewed in the direction in which the separator film is transferred.

6. The nonaqueous electrolyte secondary battery separator film transfer device as set forth in claim 5, wherein the first and second magnetic field generation sources are arranged at such positions that the first and second magnetic field generation sources are displaced from each other in a direction in which the separator film is transferred.

7. The nonaqueous electrolyte secondary battery separator film transfer device as set forth in claim 5, wherein a first transfer roller is provided in the transfer path so as to come into contact with a first surface of the separator film, and
the second magnetic field generation source is arranged at a position opposite to the first transfer roller.

8. The nonaqueous electrolyte secondary battery separator film transfer device as set forth in claim 7, wherein a second transfer roller to contact a second surface of the separator film is provided in the transfer path, and
the first magnetic field generation source is arranged at a position opposite to the second transfer roller.

9. A nonaqueous electrolyte secondary battery separator film transfer device comprising:
a transfer path through which a nonaqueous electrolyte secondary battery separator film is transferred; and
a magnetic field generation unit having a longitudinal shape that extends in a straight line, the magnetic field generation unit including: a magnetic field generation source which generates a magnetic field for removing, from the separator film being transferred, a magnetic substance adhering to the separator film; and a cover which surrounds the magnetic field generation source and is made of a non-magnetic substance, the magnetic field generation unit being detachably arranged in the transfer path,
wherein a guide is provided, in the transfer path, for sliding the magnetic field generation unit along a longitudinal direction of the magnetic field generation unit so that the magnetic field generation unit is attached, and
wherein the guide supports the magnetic field generation unit on a side of the magnetic field generation unit which side is opposite to a side thereof facing the separator film.

10. The nonaqueous electrolyte secondary battery separator film transfer device as set forth in claim 9, wherein the cover has an outer surface which is lower in rigidity than an outer surface of the magnetic field generation source.

11. The nonaqueous electrolyte secondary battery separator film transfer device as set forth in claim 9, wherein the cover has an opening provided in a portion where the magnetic field generation source faces the separator film, and the cover surrounds a portion other than the portion where the magnetic field generation source faces the separator film,
the magnetic field generation source has a longitudinal shape that extends in a straight line, and
the cover, inside of it, holds the magnetic field generation source such that the magnetic field generation source is rotatable about a longitudinal axis of the magnetic field generation source.

12. A nonaqueous electrolyte secondary battery separator film transfer device comprising:
a transfer path through which a nonaqueous electrolyte secondary battery separator film is transferred;
a magnetic field generation source which is arranged in the transfer path and generates a magnetic field for removing, from the separator film being transferred, a magnetic substance adhering to the separator film;
an assisting mechanism which assists in the removal of the magnetic substance by the magnetic field generation source, the assisting mechanism being a gas discharge mechanism which assists in the removal of the magnetic substance by blowing a gas onto the separator film; and a movement mechanism which allows a distance to the magnetic field generation source from the separator film to be variable, the movement mechanism integrally moving the magnetic field generation source and the gas discharge mechanism.

13. The nonaqueous electrolyte secondary battery separator film transfer device as set forth in claim 12, wherein the gas discharge mechanism discharges a gas in a direction from an upstream side and/or a downstream side of the transfer direction of the separator film to a side of the magnetic field generation source.

14. The nonaqueous electrolyte secondary battery separator film transfer device as set forth in claim 12, wherein the assisting mechanism is a mechanism which allows a part of the transfer path to be a transfer path that extends along a curved line so that the surface of the separator film which surface faces the magnetic field generation source is convex.

* * * * *